United States Patent
Fukuda et al.

(10) Patent No.: US 9,680,636 B2
(45) Date of Patent: Jun. 13, 2017

(54) TRANSMISSION SYSTEM, TRANSMISSION METHOD AND ENCRYPTING APPARATUS

(71) Applicant: FUJITSU LIMITED, Kawasaki-shi, Kanagawa (JP)

(72) Inventors: Isamu Fukuda, Yokohama (JP); Kazuhiro Yasuno, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 14/605,526

(22) Filed: Jan. 26, 2015

(65) Prior Publication Data

US 2015/0222432 A1   Aug. 6, 2015

(30) Foreign Application Priority Data

Feb. 6, 2014   (JP) .................. 2014-020947

(51) Int. Cl.
  *H04L 9/06*   (2006.01)
  *G09C 1/00*   (2006.01)

(52) U.S. Cl.
  CPC .............. *H04L 9/0637* (2013.01); *G09C 1/00* (2013.01); *H04L 2209/60* (2013.01)

(58) Field of Classification Search
  CPC ........................................................ G09C 1/00
  See application file for complete search history.

(56) References Cited

FOREIGN PATENT DOCUMENTS

| JP | 2005-167635 | 6/2005 |
|---|---|---|
| JP | 2012-100350 | 5/2012 |
| JP | 2013-102547 | 5/2013 |

OTHER PUBLICATIONS

S. Kent et al., "Security Architecture for the Internet Protocol", Network Working Group, RFC 4301, Dec. 2005 (101 pages).
S. Kent, "IP Encapsulating Security Payload (ESP)", Network Working Group, RFC 4303, Dec. 2005 (44 pages).
C. Kaufman, "Internet Key Exchange (IKEv2) Protocol", Network Working Group, RFC 4306, Dec. 2005 (99 pages).

*Primary Examiner* — Azizul Choudhury
(74) *Attorney, Agent, or Firm* — Fujitsu Patent Center

(57) ABSTRACT

In a first transmission apparatus, a first head encryption unit encrypts a head block of first plain text using ID. A non-head encryption unit encrypts a block using the preceding encrypted block. A first transmitter transmits first encrypted data and the ID to a second transmission apparatus. A first holding unit holds end encrypted data. A second head encryption unit encrypts a head block of second plain text using the end encrypted data. A second transmitter transmits second encrypted data generated by the second head encryption unit to the second transmission apparatus. In the second transmission apparatus, a first decryption unit performs decryption on the first encrypted data using the ID. A second holding unit holds the end encrypted data included in the first encrypted data. A second decryption unit decrypts the second encrypted data using the end encrypted data.

10 Claims, 27 Drawing Sheets

210

PROPOSAL 1

TRANSFORM TYPE: IV METHOD

| IV ATTACHMENT POLICY | 2 |
| --- | --- |
| RE-TRANSMISSION REQUEST | 2 |
| SEQUENCE NUMBER DIFFERENCE | 32 |

PROPOSAL 2

TRANSFORM TYPE: IV METHOD

| IV ATTACHMENT POLICY | 2 |
| --- | --- |
| RE-TRANSMISSION REQUEST | 2 |
| SEQUENCE NUMBER DIFFERENCE | 64 |

⋮

PROPOSAL n

TRANSFORM TYPE: IV METHOD

| IV ATTACHMENT POLICY | 1 |
| --- | --- |
| RE-TRANSMISSION REQUEST | 1 |
| SEQUENCE NUMBER DIFFERENCE | 64 |

FIG. 7

| KEY INFORMATION (SA) | PARAMETER | | |
|---|---|---|---|
| SA #0 | SPI | | |
| | KEY DATA | | |
| | ALGORITHM | | |
| | SEQUENCE NUMBER | | |
| | IV ATTACHMENT POLICY | | |
| | RE-TRANSMISSION REQUEST | | |
| | SEQUENCE NUMBER DIFFERENCE | | |
| | IV STATE | | |
| | IV #0 | SEQUENCE NUMBER | |
| | | IV | |
| | | DELIVERY CONFIRMATION | |
| | IV #1 | SEQUENCE NUMBER | |
| | | IV | |
| | | DELIVERY CONFIRMATION | |
| | ⋮ | | |
| | IV #n | SEQUENCE NUMBER | |
| | | IV | |
| | | DELIVERY CONFIRMATION | |
| SA #1 | (SAME AS ABOVE) | | |
| ⋮ | | | |
| SA #m | (SAME AS ABOVE) | | |

FIG. 8

| SEQUENCE | IV |
|---|---|
| 1 | ENCRYPTED BLOCK a-L |
| 2 | ENCRYPTED BLOCK b-L |
| 3 | ENCRYPTED BLOCK c-L |
| 4 | INVALID |
| 5 | ENCRYPTED BLOCK e-L |
| 6 | ENCRYPTED BLOCK f-L |

FIG. 16

TRANSMISSION SYSTEM, TRANSMISSION METHOD AND ENCRYPTING APPARATUS

CROSS-REFERENCE TO RELATED APPLICATION

This application is based upon and claims the benefit of priority of the prior Japanese Patent Application No. 2014-020947, filed on Feb. 6, 2014, the entire contents of which are incorporated herein by reference.

FIELD

The embodiments discussed herein relate to a transmission system and a transmission method.

BACKGROUND

In the recent network environment, there is an ever increasing trend of a crime aiming at security vulnerability such as data leakage and service interruption by hacking.

For example, a radio base station apparatus of a mobile communication system such as LTE (Long Term Evolution) supports an important infrastructure of a society and is expected to have a high reliability. The security vulnerability in the radio base station apparatus has a great socioeconomic influence and is a problem to be worried about significantly. Accordingly, a very strong protocol is desired in terms of wiretapping prevention and falsification detection, and the IP Security Protocol (hereinafter, described as IPsec) is widely used as a protocol realizing security in the IP (Internet Protocol) layer.

One security function provided by IPsec is data encryption using a technique called a block cipher. For example, IPsec prepares a CBC (Cipher block Chaining) mode. The CBC mode attaches a code called IV (Initial Vector) to a header of each encrypted packet and performs encryption after exclusive OR of IV and a plain text of a head encrypted block, and thereby realizes communication having an improved encryption strength.

RFC4301, "Security Architecture for the Internet Protocol", December 2005

RFC4303, "IP Encapsulating Security Payload (ESP)", December 2005

RFC4306, "Internet Key Exchange (IKEv2) Protocol", December 2005

Meanwhile, there are a free-call service application using a short packet (e.g., approximately 150 bytes) and an online game service, as services provided through the mobile communication system.

For the short packet too, IV is attached to a header for each encrypted packet. For example, in the case of AES (Advanced Encryption Standard) which is one of encryption algorithms, IV having the same size as the length of the encryption algorithm (16 bytes) is attached. A fixed overhead due to the IV attachment increases communication traffic to become a burden on a communication line. For example, the increase of the communication traffic between the radio base station apparatus and a security gateway in the mobile communication system (transmission system) may cause a network bottleneck. Note that, it is well known that in the transmission system, the security of encrypted data becomes vulnerable in the case of not using IV as in ECB (Electronic Codebook) mode prepared by IPsec or the like, compared with the case of using IV as in the CBC mode.

SUMMARY

According to one aspect, there is provided a transmission system including a first transmission apparatus to encrypt data, and a second transmission apparatus to receive encrypted data from the first transmission apparatus and decrypt the encrypted data, the first transmission apparatus including: a first head encryption unit configured to encrypt a head block among a plurality of blocks obtained by dividing data to be encrypted, using an encryption initial value; a non-head encryption unit configured to, using an encrypted block among the plurality of blocks, encrypt a block next to the encrypted block; a first transmitter configured to transmit first encrypted data generated by the first head encryption unit and the non-head encryption unit and the encryption initial value to the second transmission apparatus; a first holding unit configured to hold end encrypted data obtained by encrypting an end block among the plurality of blocks by the non-head encryption unit; a second head encryption unit configured to encrypt a head block among a plurality of blocks obtained by dividing data to be encrypted, using the end encrypted data held by the first holding unit; and a second transmitter configured to transmit second encrypted data generated by the second head encryption unit and the non-head encryption unit to the second transmission apparatus, and the second transmission apparatus including: a first decryption unit configured to perform decryption on the first encrypted data using the encryption initial value, the first encrypted data and the encryption initial value being received from the first transmission apparatus; a second holding unit configured to hold the end encrypted data included in the first encrypted data; and a second decryption unit configured to decrypt the second encrypted data received from the first transmission apparatus, using the end encrypted data held by the second holding unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of IKE packet parameter setting used in the radio access system in the second embodiment;

FIG. 8 illustrates an example of SADB in the second embodiment;

FIG. 16 illustrates an example of an SA update state which is managed by the security gateway in the second embodiment;

DESCRIPTION OF EMBODIMENTS

Figure 1:
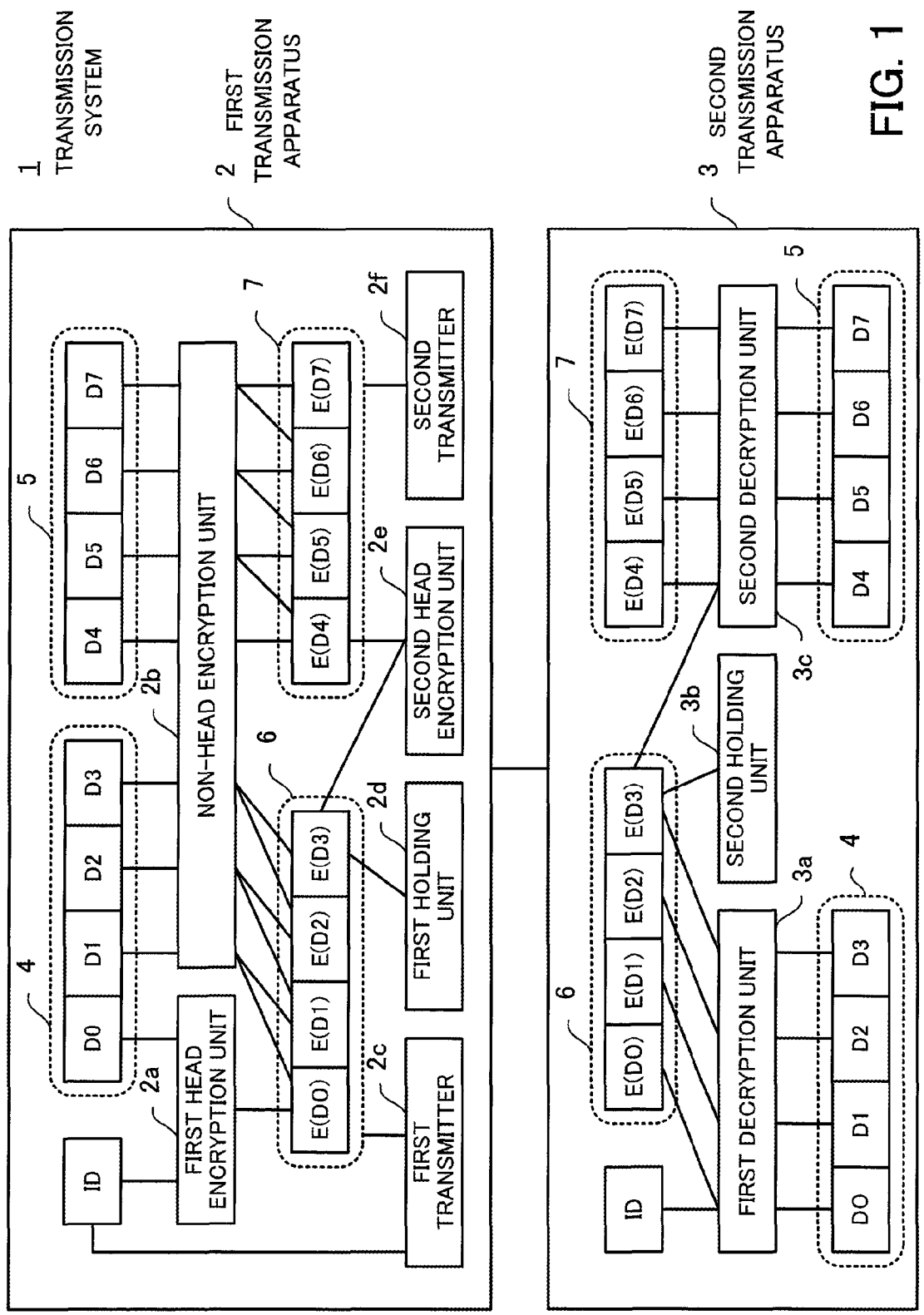
FIG. 1 illustrates a configuration example of a transmission system in a first embodiment.

Several embodiments will be described below with reference to the accompanying drawings, wherein like reference numerals refer to like elements throughout.

First Embodiment

First, there will be explained a transmission system of a first embodiment by the use of FIG. 1. FIG. 1 illustrates a configuration example of the transmission system of the first embodiment.

A transmission system 1 includes a first transmission apparatus 2 and a second transmission apparatus 3 connected communicatably with the first transmission apparatus 2. The transmission system 1 sets a communication section between the first transmission apparatus 2 and the second transmission apparatus 3 to be an encryption communication section.

The first transmission apparatus 2 encrypts plain text data sets 4 and 5 and transmits encrypted data sets 6 and 7 to the second transmission apparatus 3. The second transmission apparatus 3 receives the encrypted data sets 6 and 7 and decrypts them into the plain text data sets 4 and 5.

The first transmission apparatus 2 includes a first head encryption unit 2a, a non-head encryption unit 2b, a first transmitter 2c, a first holding unit 2d, a second head encryption unit 2e, and a second transmitter 2f.

The first head encryption unit 2a encrypts a head block D0 among a plurality of blocks D0, D1, D2, and D3 obtained by dividing plain text data 4 to be encrypted, into an encrypted block E(D0) using ID (encryption initial value).

The non-head encryption unit 2b encrypts a block next to an encrypted block, using the encrypted block among the plurality of blocks. That is, the non-head encryption unit 2b encrypts the (n+1)-th block using the already encrypted n-th block (here, n is an integer not smaller than 1).

For example, since the head block D0 of the plain text data 4 is encrypted into the encrypted block E(D0) by the first head encryption unit 2a, the non-head encryption unit 2b encrypts the blocks D1, D2, and D3 except the head block in the plain text data 4. The non-head encryption unit 2b encrypts the block D1 next to the head block D0 into an encrypted block E(D1) using the encrypted block E(D0). After that, the non-head encryption unit 2b encrypts the block D2 next to the block D1 into an encrypted block E(D2) using the encrypted block E(D1). Similarly, the non-head encryption unit 2b encrypts the block D3 into an encrypted block E(D3).

Further, as will be explained below, since the head block D4 of the plain text data 5 is encrypted by the second head encryption unit 2e into an encrypted block E(D4), the non-head encryption unit 2b encrypts blocks D5, D6, and D7 except the head block of the plain text data 5. The non-head encryption unit 2b encrypts the block D5 next to the head block D4 into an encrypted block E(D5) using the encrypted block E(D4)). After that, the non-head encryption unit 2b encrypts the block D6 next to the block D5 into an encrypted block E(D6) using the encrypted block E(D5). Similarly, the non-head encryption unit 2b encrypts the block D7 into an encrypted block E(D7).

The first transmitter 2c transmits first encrypted data 6 encrypted by the first head encryption unit 2a and the non-head encryption unit 2b and ID to the second transmission apparatus 3. For example, the first transmitter 2c transmits the first encrypted data 6 as packet data, including ID in a header.

The first holding unit 2d holds end encrypted data generated by the non-head encryption unit 2b. The end encrypted data is obtained by encrypting an end block among the plurality of blocks. For example, when the non-head encryption unit 2b encrypts the plain text data 4, the end encrypted data is the encrypted block E(D3).

The second head encryption unit 2e encrypts the head block D4 among the plurality of blocks D4, D5, D6, and D7 which are obtained by dividing the plain text data 5, into the encrypted block E(D4) using the encrypted block E(D3) held by the first holding unit 2d. Here, the plain text data 5 is to be encrypted subsequent to the plain text data 4. Thereby, the second head encryption unit 2e may use the end encrypted data which is based on the plain text data 4 and held in the first holding unit 2d, for the encryption of the plain text data 5.

The second transmitter 2f transmits second encrypted data 7 generated by the second head encryption unit 2e and the non-head encryption unit 2b to the second transmission apparatus 3. For example, the second transmitter 2f transmits the second encrypted data 7 as packet data. Here, since the second encrypted data 7 is generated without using ID, the second transmitter 2f transmits the second encrypted data 7 without including ID in the header.

Here, when the non-head encryption unit 2b encrypts the plain text data 5, the first holding unit 2d holds the encrypted block E(D7). When encrypting additional plain text data after the encryption of the plain text data 5, the first transmission apparatus 2 encrypts the additional plain text data using the encrypted block E(D7). Thereby, the first transmission apparatus 2 does not need ID for each encryption of the plain text data, and further does not need to transmit ID to the second transmission apparatus 3 for decryption.

The second transmission apparatus 3 includes a first decryption unit 3a, a second holding unit 3b, and a second decryption unit 3c.

The first decryption unit 3a uses ID for decryption of the encrypted data. The first decryption unit 3a performs the decryption from the first encrypted data 6 and ID received from the first transmission apparatus 2. For example, the first decryption unit 3a obtains the block D0 from the encrypted block E(D0) and ID, and obtains the block D1 from the encrypted block E(D0) and the encrypted block E(D1). After that, similarly the first decryption unit 3a obtains the block D2 from the encrypted block E(D1) and the encrypted block E(D2), and obtains the block D3 from the encrypted block E(D2) and the encrypted block E(D3). In this manner, the first decryption unit 3a decrypts the head (first) encrypted block using ID, and decrypts the (n+1)-th encrypted block using the n-th encrypted block (here, n is an integer not smaller than 1).

The second holding unit 3b holds the end encrypted data included in the first encrypted data 6. The end encrypted data included in the first encrypted data 6 is the encrypted block E(D3), for example.

The second decryption unit 3c uses the end encrypted data for the decryption of the encrypted data. The second decryption unit 3c performs the decryption of the second encrypted data 7 received from the first transmission apparatus 2, using the end encrypted data held by the second holding unit 3b. For example, the second decryption unit 3c obtains the block D4 from the encrypted block E(D4) and the encrypted block E(D3) which is the end encrypted data, and obtains the block D5 from the encrypted block E(D4) and the encrypted block E(D5). After that, similarly the second decryption unit 3c obtains the block D6 from the encrypted block E(D5) and the encrypted block E(D6), and obtains the block D7 from the encrypted block E(D6) and the encrypted block E(D7). In this manner, the second decryption unit 3c decrypts the head (first) encrypted block using the end encrypted data, and decrypts the (n+1)-th encrypted block using the n-th encrypted block (here, n is an integer not smaller than 1).

Here, further the second holding unit 3b holds the end encrypted data included in the second encrypted data 7. Thereby, when the first transmission apparatus 2 encrypts additional plain text data using the encrypted block E(D7), the second decryption unit 3c may decrypt the encrypted additional plain text data using the encrypted block E(D7). Thereby, the second transmission apparatus 3 does not need ID and does not need to receive ID for the decryption from the first transmission apparatus 2, for each decryption into the plain text data.

In this manner, the transmission system 1 is capable of transmitting the plain text data 5 from the first transmission apparatus 2 to the second transmission apparatus 3 while securing the same security as that of the plain text data 4 which is encrypted by the use of ID. Further, the transmission system 1 does not need attachment of information corresponding to ID when transmitting the encrypted data 7 obtained by encrypting the plain text data 5, and thereby the transmission system 1 is capable of reducing overhead applied to the transmission of the encrypted data 7 compared with the case of attaching ID to the header.

Accordingly, the transmission system 1 is capable of reducing the network load, while improving the security.

Second Embodiment

Figure 2:
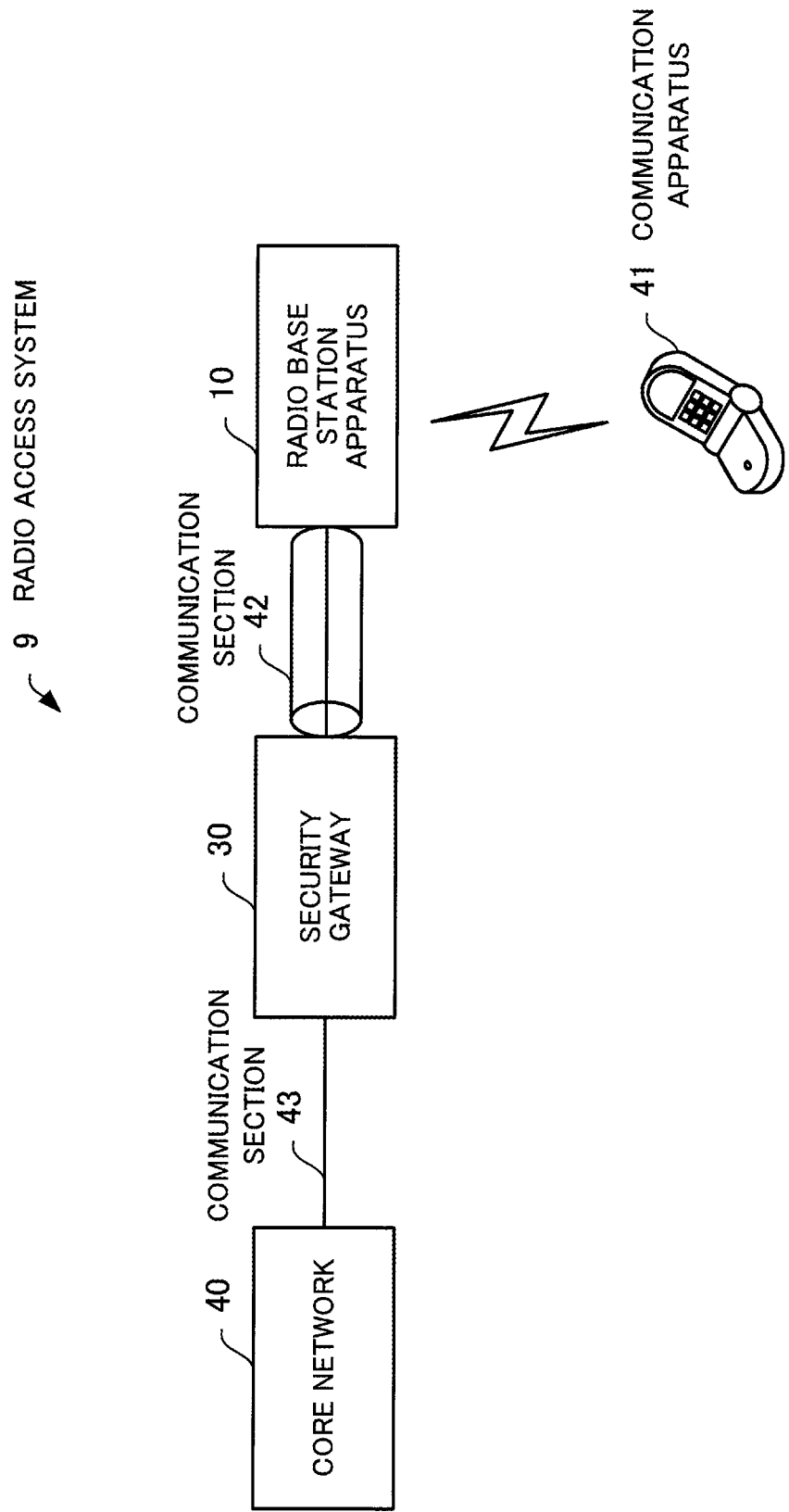
FIG. 2 illustrates a configuration example of a radio access system in a second embodiment.

Next, there will be explained a radio access system of a second embodiment by the use of FIG. 2. FIG. 2 illustrates a configuration example of the radio access system of the second embodiment.

The radio access system 9 includes a radio base station apparatus 10, a security gateway 30, and a communication section 42 connecting the radio base station apparatus 10 and the security gateway 30. Each of the radio base station apparatus 10 and the security gateway 30 is one form of a transmission apparatus transmitting a packet, and the radio access system 9 is one form of a transmission system transmitting a packet between two or more transmission apparatuses.

The radio base station apparatus 10 provides a radio base station function capable of radio communication with a communication apparatus 41 such as a mobile phone and a smart phone. For example, the radio access system 9 including the radio base station apparatus 10 realizes a mobile communication system such as LTE.

The radio base station apparatus 10 carries out key exchange with the security gateway 30 by IKE (Internet Key Exchange), and establishes the communication section 42 by IPsec to be connected with the security gateway 30. Accordingly, the radio base station apparatus 10 is connected peer to peer with the security gateway 30. The security gateway 30 is an opposite apparatus for the radio base station apparatus 10. The security gateway 30 is connected to a core network 40 via a communication section 43. While the communication section 43 is a non-encryption communication section, the communication section 43 may be an encryption communication section like the communication section 42.

Figure 3:
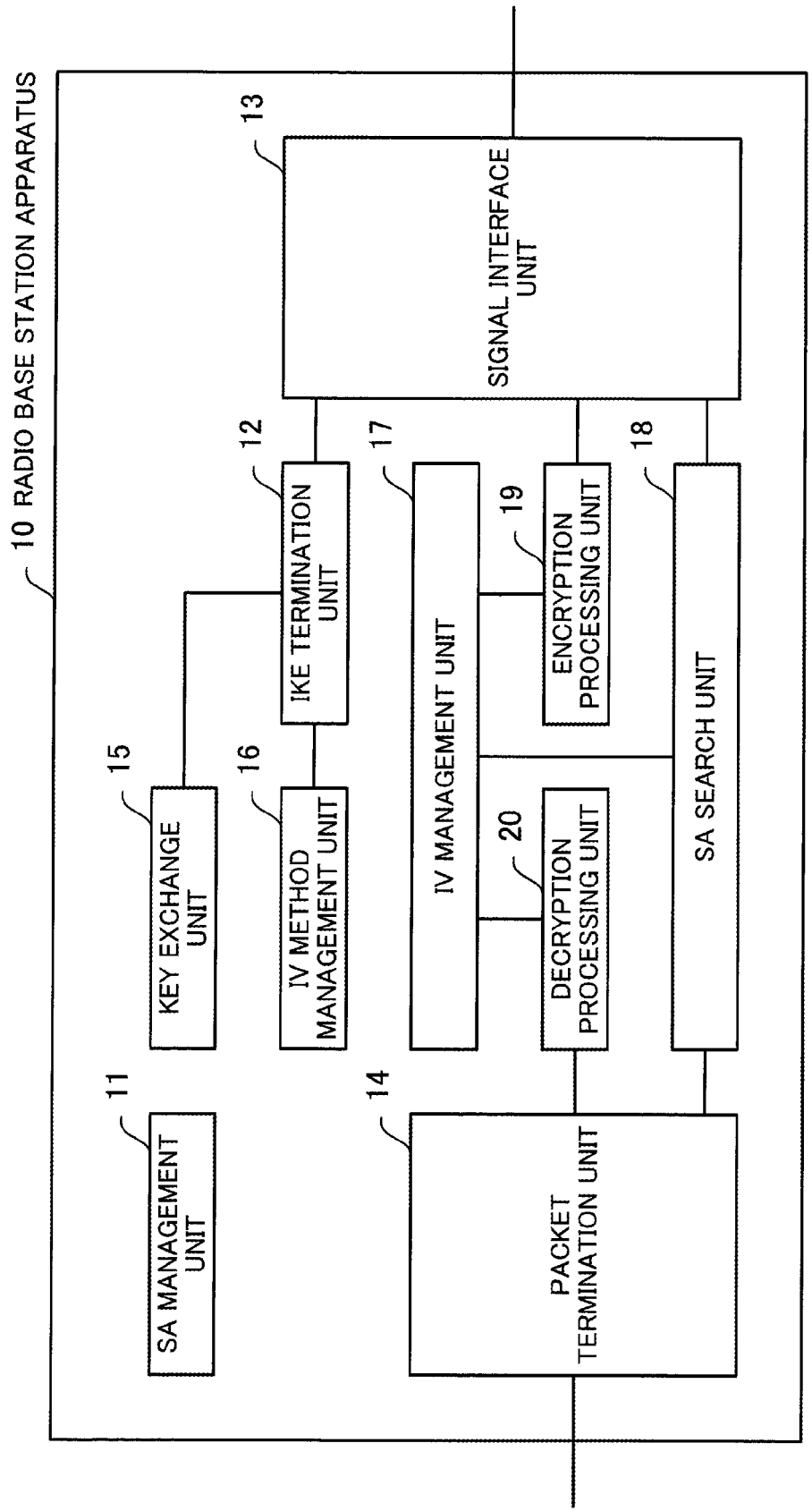
FIG. 3 illustrates a functional configuration example of a radio base station apparatus in the second embodiment.

Next, there will be explained a function of the radio base station apparatus 10 by the use of FIG. 3. FIG. 3 illustrates a functional configuration example of the radio base station apparatus of the second embodiment.

The radio base station apparatus 10 includes an SA (Security Association) management unit 11, an IKE termination unit 12, a signal interface unit 13, a packet termination unit 14, a key exchange unit 15, an IV method management unit 16, an IV management unit 17, an SA search unit 18, an encryption processing unit 19, and a decryption processing unit 20.

The SA management unit 11 manages SADB (Security Association DataBase) which collects SA. SA is information related to a predetermined security policy, and is a parameter group for realizing the predetermined security policy, for example. Here, SADB (SA) managed by the SA management unit 11 may be referred to or updated by each of the units in the radio base station apparatus 10.

The IKE termination unit 12 controls transmission and reception of an IKE packet via the signal interface unit 13, and performs termination processing of IKE packet communication. For example, the IKE termination unit 12 performs IKE SA and CHILD SA negotiation related to IPsec. Further, the IKE termination unit 12 performs generation, update, and deletion of SA including key information.

The signal interface unit 13 performs signal transmission and reception with the opposite apparatus. For example, the signal interface unit 13 performs packet transmission and reception with the security gateway 30. The packet termination unit 14 performs termination processing for packet communication of various kinds of protocol with the communication apparatus 41.

The key exchange unit 15 performs exchange of key information used for structuring SADB via the IKE termination unit 12. The IV method management unit 16 performs IV method negotiation with the opposite apparatus (e.g., security gateway 30) via the IKE termination unit 12. For example, the IV method management unit 16 proposes available IV methods to the opposite apparatus, and determines an available IV method and related parameters together with the opposite apparatus.

The IV management unit 17 performs IV management. IV includes the random-number initial value or the end encrypted data which are explained in the first embodiment. The IV management unit 17 stores information related to IV into SA when a packet is transmitted. Further, the IV management unit 17 obtains information related to IV with reference to SA when the packet is received. The SA search unit 18 searches SADB for SA corresponding to the packet.

The encryption processing unit 19 performs packet encryption. The encryption processing unit 19 encrypts a plain text packet (plain text data) into an encrypted packet (encrypted data) using IV obtained by the IV management unit 17 according to SA which is searched for by the SA search unit 18. Here, IV includes the encryption initial value and the end encrypted data. Accordingly, the encryption processing unit 19 generates the encrypted packet from the plain text packet using the encryption initial value or generates the encrypted packet from the plain text packet using the end encrypted data. The encrypted packet generated by the encryption processing unit 19 is transmitted to the opposite apparatus via the signal interface unit 13.

The decryption processing unit 20 performs decryption of a packet received from the opposite apparatus via the signal interface unit 13. The decryption processing unit 20 decrypts the encrypted packet into the plain text packet using IV obtained by the IV management unit 17 according to SA which is searched for by the SA search unit 18. The decryption processing unit 20 generates the plain text packet from the encrypted packet using the encryption initial value or generates the plain text packet from the encrypted packet using the end encrypted data.

Note that, while the function of the radio base station apparatus 10 is explained by the use of FIG. 3, also the security gateway 30 which is the opposite apparatus for the radio base station apparatus 10 has the same function as the radio base station apparatus 10.

Figure 4:
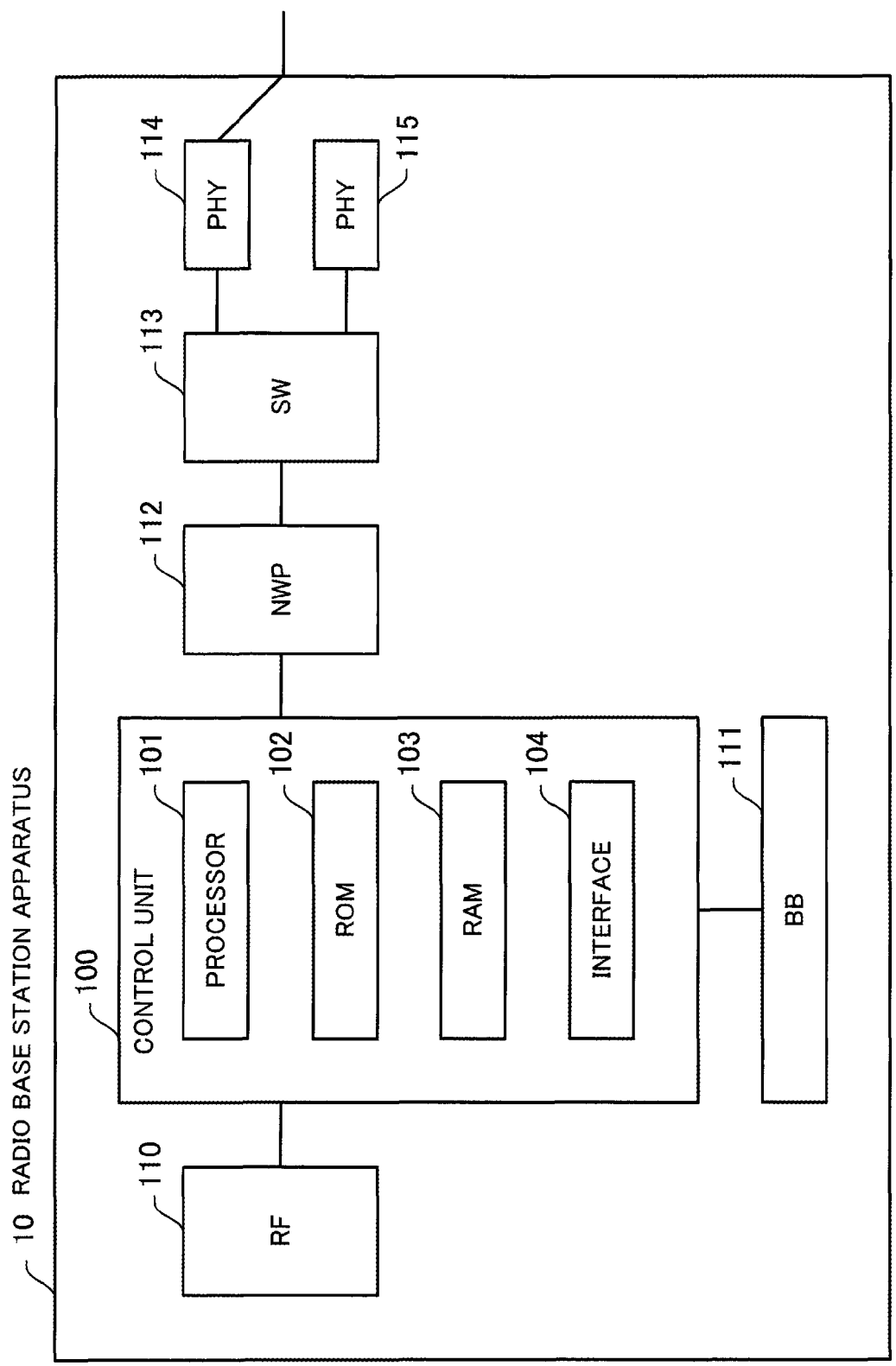
FIG. 4 illustrates a hardware configuration example of the radio base station apparatus in the second embodiment.

Next, there will be explained a hardware configuration of the radio base station apparatus 10 by the use of FIG. 4. FIG. 4 illustrates a hardware configuration example of the radio base station apparatus in the second embodiment.

The radio base station apparatus 10 includes RF (Radio Frequency) 110, a control unit 100, BB (Baseband) 111, NWP (Network Processor) 112, SW (Switch) 113, and PHY (Physical layer) 114, 115.

RF 110 frequency-converts (e.g., up-converts) a baseband signal, and outputs the converted signal as a radio signal to an antenna which is not illustrated in the drawing. Further, RF 110 frequency-converts (e.g., down-converts) a radio signal received by the antenna, and outputs a baseband signal. BB 111 converts a data signal into the baseband signal, and outputs the baseband signal to RF 110. Further, BB 111 extracts data from the baseband signal output from RF 110. NWP 112 functions as an IPsec termination, and performs IKE message exchange and the like. SW 113 controls a communication destination as a layer-2 SW or a layer-3 SW. PHY 114, 115 provides a physical communication connection function.

The control unit 100 totally controls the radio base station apparatus 10. In the control unit 100, a processor 101 controls the entire apparatus. The processor 101 is connected with ROM (Read Only Memory) 102, RAM (Random Access Memory) 103, an interface 104 and a plurality of peripheral devices via a bus which is not illustrated in the drawing. The processor 101 may be a multiprocessor. The processor 101 is CPU (Central Processing Unit), MPU (Micro Processing Unit), DSP (Digital Signal Processor), ASIC (Application Specific Integrated Circuit), or PLD (Programmable Logic Device), for example. Further, the processor 101 may be a combination of two or more elements among CPU, MPU, DSP, ASIC, and PLD.

ROM 102 preserves stored contents also during power shutdown of the control unit 100. ROM 102 is a semiconductor storage device such as EEPROM (Electrically Erasable Programmable Read-Only Memory) and a flash memory, HDD (Hard Disk Drive), or the like, for example. Further, ROM 102 is used as an auxiliary storage device of the control unit 100. ROM 102 stores a program and firmware of OS (Operating System), an application program, and various kinds of data.

RAM 103 is used as a main storage device of the control unit 100. RAM 103 temporarily stores at least a part of the program and the firmware of OS and the application program which the processor 101 is caused to execute. Further, RAM 103 stores the various kinds of data needed for processing by the processor 101. Further, RAM 103 may include a cache memory separately from the memory used for storing the various kinds of data. The interface 104 is a peripheral device connected to the bus. The interface 104 is connected to an input-output apparatus and performs inputting and outputting.

The processing function of the radio base station apparatus 10 of the second embodiment is realized by the above hardware configuration. Note that each of the security gateway 30, and the first transmission apparatus 2 and the second transmission apparatus 3 described in the first embodiment is also realized by the same hardware as the radio base station apparatus 10 illustrated in FIG. 4.

Each of the radio base station apparatus 10, the security gateway 30, the first transmission apparatus 2, and the second transmission apparatus 3 realizes the processing function of the embodiment by executing a program recorded in a computer-readable recording medium, for example. The program describing processing contents which each of the radio base station apparatus 10, the security gateway 30, the first transmission apparatus 2, and the second transmission apparatus 3 is caused to execute may be recorded in any of various recording media. For example, the program which each of the radio base station apparatus 10, the security gateway 30, the first transmission apparatus 2, and the second transmission apparatus 3 is caused to execute may be stored in the ROM 102. The processor 101 loads at least a part of the program in ROM 102 to RAM 103, and executes the program. Further, the program which each of the radio base station apparatus 10, the security gateway 30, the first transmission apparatus 2, and the second transmission apparatus 3 is caused to execute also may be recorded in a portable recoding medium such as an optical disk, a memory device, and a memory card which are not illustrated in the drawing. The optical disk includes DVD (Digital Versatile Disk), DVD-RAM, CD-ROM (Compact Disk Read Only Memory), CD-R (Recordable)/RW (ReWritable), and the like. The memory device is a recording medium mounting a function of communicating with the interface 104 or a device connection interface which is not illustrated in the drawing. For example, the memory device is capable of performing data write into the memory card or data read from the memory card by a memory reader-writer. The memory card is a card-type recording medium.

The program stored in the portable recording medium becomes executable after having been installed into ROM 102 by control of the processor 101, for example. Further, the processor 101 may execute the program by reading the program directly from the portable recording medium.

Figure 5:
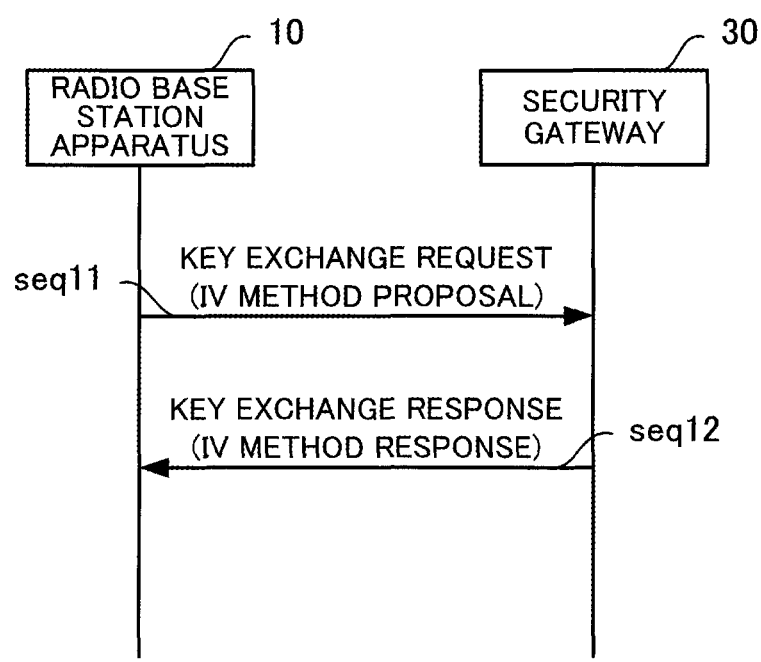
FIG. 5 illustrates an example of a negotiation sequence of IV method and parameters which is performed by the radio base station apparatus and a security gateway in the second embodiment.

Next, there will be explained packet transmission in the communication section 42 between the radio base station apparatus 10 and the security gateway 30, by the use of FIG. 5 to FIG. 12. First, negotiation of the IV method and various kinds of parameter will be explained by the use of FIG. 5. FIG. 5 illustrates an example of a negotiation sequence of the IV method and the parameters which is performed by the radio base station apparatus and the security gateway of the second embodiment.

The radio base station apparatus 10 and the security gateway 30 perform negotiation of an encryption algorithm including determination of the IV method and the parameters, before performing encryption communication by IPsec. This negotiation of the encryption algorithm and the encryption key exchange may be performed by the use of IKE, for example.

(Sequence seq11) The radio base station apparatus 10 requests the security gateway 30 to perform the key exchange. At this time, the radio base station apparatus 10 proposes available IV methods.

(Sequence seq12) The security gateway 30 returns the key exchange to the radio base station apparatus 10. At this time, the security gateway 30 selects one of the IV methods proposed by the radio base station apparatus 10 to perform the response.

In this manner, the radio base station apparatus 10 and the security gateway 30 perform negotiation whether the IV method without IV attachment or not, that is, the IV method using a header without IV may be handled or not. Thereby, the radio base station apparatus 10 and the security gateway 30 perform the encryption key exchange and also perform determination of the encryption algorithm including the IV method and the various kinds of parameter.

Figure 6:
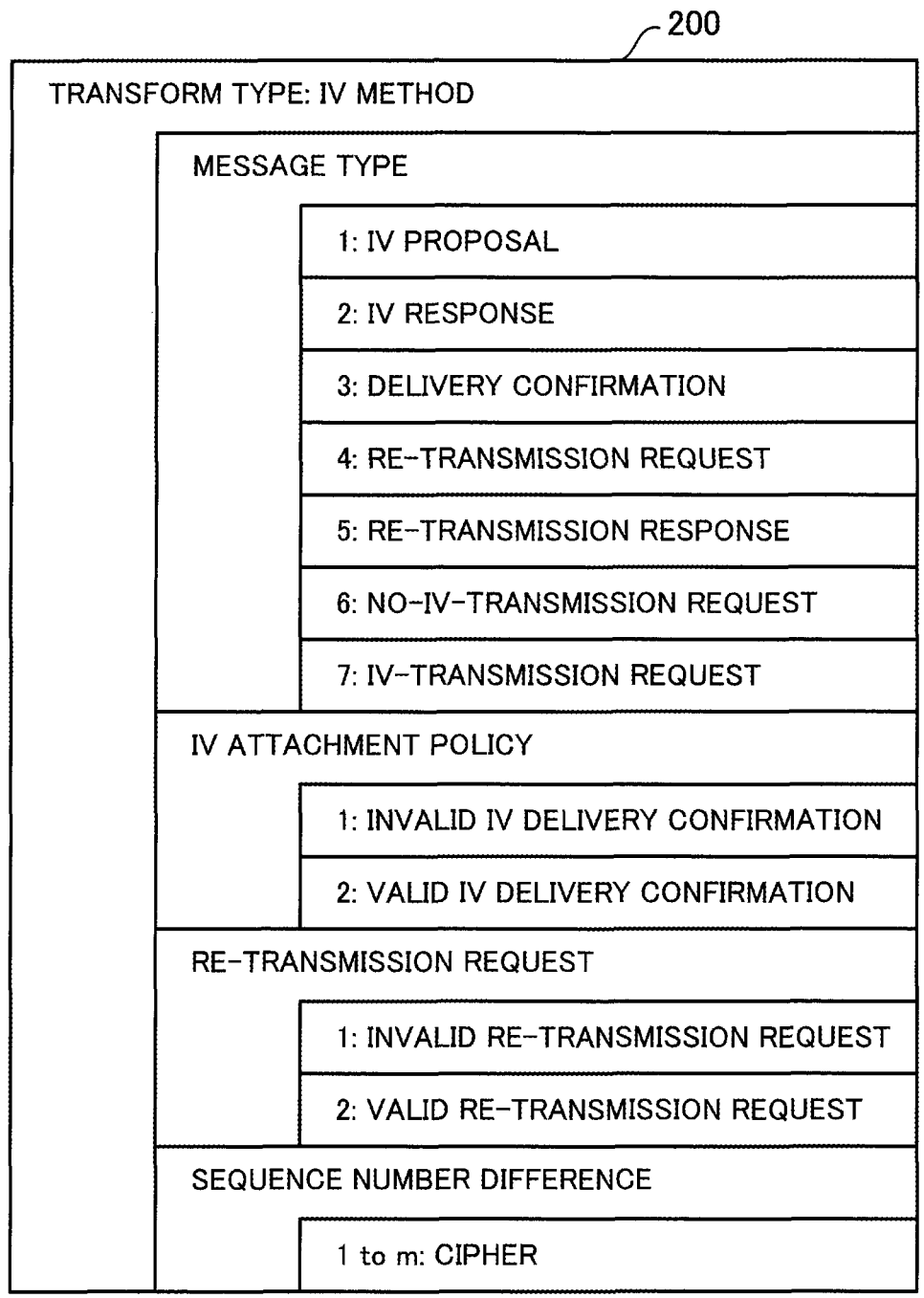
FIG. 6 illustrates an example of an IKE packet format used in the radio access system in the second embodiment.

Here, there will be explained a packet format used for the determination of the IV method and the parameters, by the use of FIG. 6. FIG. 6 illustrates an example of an IKE packet format used in the radio access system of the second embodiment.

An IKE packet format 200 defines a new transform type to be added to the IKE packet format, and is a part of the IKE packet format. The radio base station apparatus 10 and the security gateway 30 add the IKE packet format 200 to various kinds of proposal of the IKE packet and use the IKE packet format 200. The radio base station apparatus 10 and the security gateway 30 perform the negotiation for determining the IV method and the parameters by the IKE packet format 200.

The IKE packet format 200 defines the IV method as a transform type. The IKE packet format 200 is configured including a message type, an IV attachment policy, a re-transmission request, and a sequence number difference.

The message type is information specifying a message type to be notified to the opposite apparatus. The message type includes "IV proposal", "IV response", "delivery confirmation", "re-transmission request", "re-transmission response", "no-IV-transmission request", and "IV-transmission request". The message type specifies a corresponding message type by setting one of a value "1" to a value "7".

The IV attachment policy is information for determining whether IV is to be attached or not, and whether IV delivery confirmation is to be performed or not. The IV attachment policy includes "with IV attached", "invalid IV delivery confirmation (no IV attachment)", and "valid IV delivery confirmation (no IV attachment)". The IV attachment policy sets the IV attachment policy to be "with IV attached" by setting "0", sets the IV attachment policy to be "invalid IV delivery confirmation" by setting a value "1", and sets the IV attachment policy to be "valid IV delivery confirmation" by setting a value "2".

The re-transmission request is information determining whether a re-transmission request is to be performed or not when the encrypted packet does not arrive. The re-transmission request includes "invalid re-transmission request" and "valid re-transmission request". The re-transmission request sets the re-transmission request to be "invalid re-transmission request" by setting a value "1", and sets the re-transmission request to be "valid re-transmission request" by setting a value "2".

The sequence number difference is information specifying the end encrypted data used in the decryption of the encrypted packet. The sequence number difference may set a value "1" to a value "m".

Next, there will be explained an example of parameter setting using the IKE packet format 200, by the use of FIG. 7. FIG. 7 illustrates an example of the parameter setting for the IKE packet used in the radio access system of the second embodiment.

An IKE packet format 210 lists proposals setting the parameters to the IKE packet format 200. The IKE packet format 210, while listing n proposals from proposal 1 to proposal n, may list any number of proposals in a range up to an upper limit.

The parameters of proposal 1 are "2" of the IV attachment policy, "2" of the re-transmission request, and "32" of the sequence number difference, and indicate that proposal 1 is an IV method proposal proposing "valid IV-delivery confirmation", "valid re-transmission request" and the sequence number difference of "32". The parameters of proposal 2 are "2" of the IV attachment policy, "2" of the re-transmission request, and "64" of the sequence number difference, and indicate that proposal 2 is an IV method proposal proposing "valid IV-delivery confirmation, "valid re-transmission request, and the sequence number difference of "64". The parameters of proposal n are "1" of the IV attachment policy, "1" of the re-transmission request, and "64" of the sequence number difference, and indicate that proposal n is an IV method proposal proposing "invalid IV-delivery confirmation", "invalid re-transmission request", and the sequence number difference of "64".

The proposal is determined when a response is received as an IV response and selected by the opposite apparatus. SA generated based on the determined proposal is managed by the SA management unit 11.

Next, there will be explained SADB after the negotiation of the encryption algorithm including the determination of the IV method and the parameters, by the use of FIG. 8. FIG. 8 illustrates an example of SADB of the second embodiment.

SADB 220 manages SA of SA#0, SA#1, . . . , SA#m. Each SA includes SPI (Security Pointer Index), key data, an algorithm, a sequence number, the IV attachment policy, the re-transmission request, the sequence number difference, an IV state, and IV in an appropriate number.

SPI is identification information for uniquely identifying SA. The key data is the key information used for the encryption or the decryption. The algorithm (encryption algorithm) is used for the encryption or the decryption. The algorithm includes AES-CBC, 3DES (Data Encryption Standard)-CBC, and the like, for example. The sequence number is the latest sequence number in the transmission and reception. The IV attachment policy, the re-transmission request, and the sequence number difference are the same as those explained for the IKE packet format 210.

The IV state is setting information whether the transmission is to be performed including IV depending on a transmission path band. The radio base station apparatus 10 and the security gateway 30 achieve improvement in processing efficiency by enabling the transmission with IV and the transmission without IV to be switched depending on a state of the transmission path band. The IV state includes "without IV transmission" and "with IV transmission". The IV state may set the IV state to be "without IV transmission" by setting a value "0", and may set the IV state to be "with IV transmission" by setting a value "1". "Without IV transmission" is set in an initial state, in an invalid state of transmission path band monitoring, in the case that the transmission path band exceeds a predetermined upper limit value, or the like. "With IV transmission" is set in the case that the transmission path band does not exceed the predetermined upper limit value or the like.

IV is information related to IV for each offset of the sequence number difference. Here, the offset of the sequence number difference is a remainder when the sequence number is divided by the sequence number difference. For example, when the sequence number difference is "n+1", IV exists in a number of "n+1" from "IV#0" to "IV#n".

IV includes the sequence number, IV, and the delivery confirmation. The sequence number is a sequence number when IV is preserved. IV is the end encrypted data. The delivery confirmation indicates whether delivery confirmation exists or not from the reception side.

Figure 9:
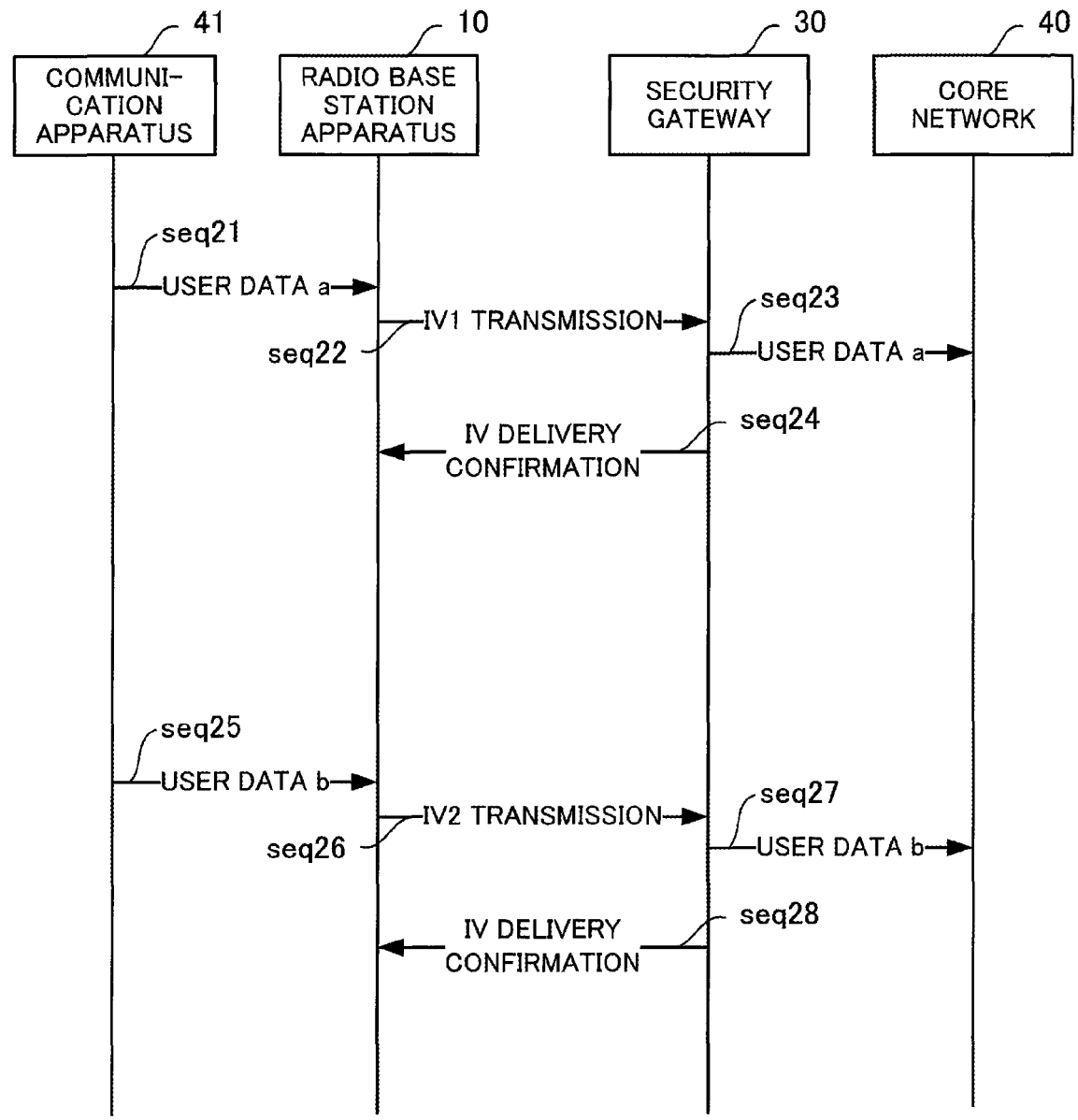
FIG. 9 illustrates an example of a packet transmission sequence with IV attached which is performed by the radio base station apparatus and the security gateway in the second embodiment.

Next, there will be explained packet transmission with IV attached, by the use of FIG. 9. FIG. 9 illustrates an example of a packet transmission sequence with IV attached which is performed by the radio base station apparatus and the security gateway of the second embodiment.

The radio base station apparatus 10 and the security gateway 30 perform encryption communication by IPsec after the negotiation of the encryption algorithm including the determination of the IV method and the parameters and after the exchange of the encryption key. First the radio base station apparatus 10 and the security gateway 30 perform the encryption communication by IPsec in the packet transmission with IV attached. The radio base station apparatus 10 and the security gateway 30 perform the packet transmission with IV attached until the sequence number of an IPsec packet reaches a sequence number "sequence number difference" from a sequence number "1". In an example of the transmission sequence illustrated in FIG. 9, the case of a sequence number difference "2" is explained.

(Sequence seq21) The communication apparatus 41 transmits user data a to the radio base station apparatus 10.

(Sequence seq22) The radio base station apparatus 10 transmits an IPsec packet (sequence number "1") which is obtained by encrypting the user data a received from the communication apparatus 41, to the security gateway 30.

Figure 10:
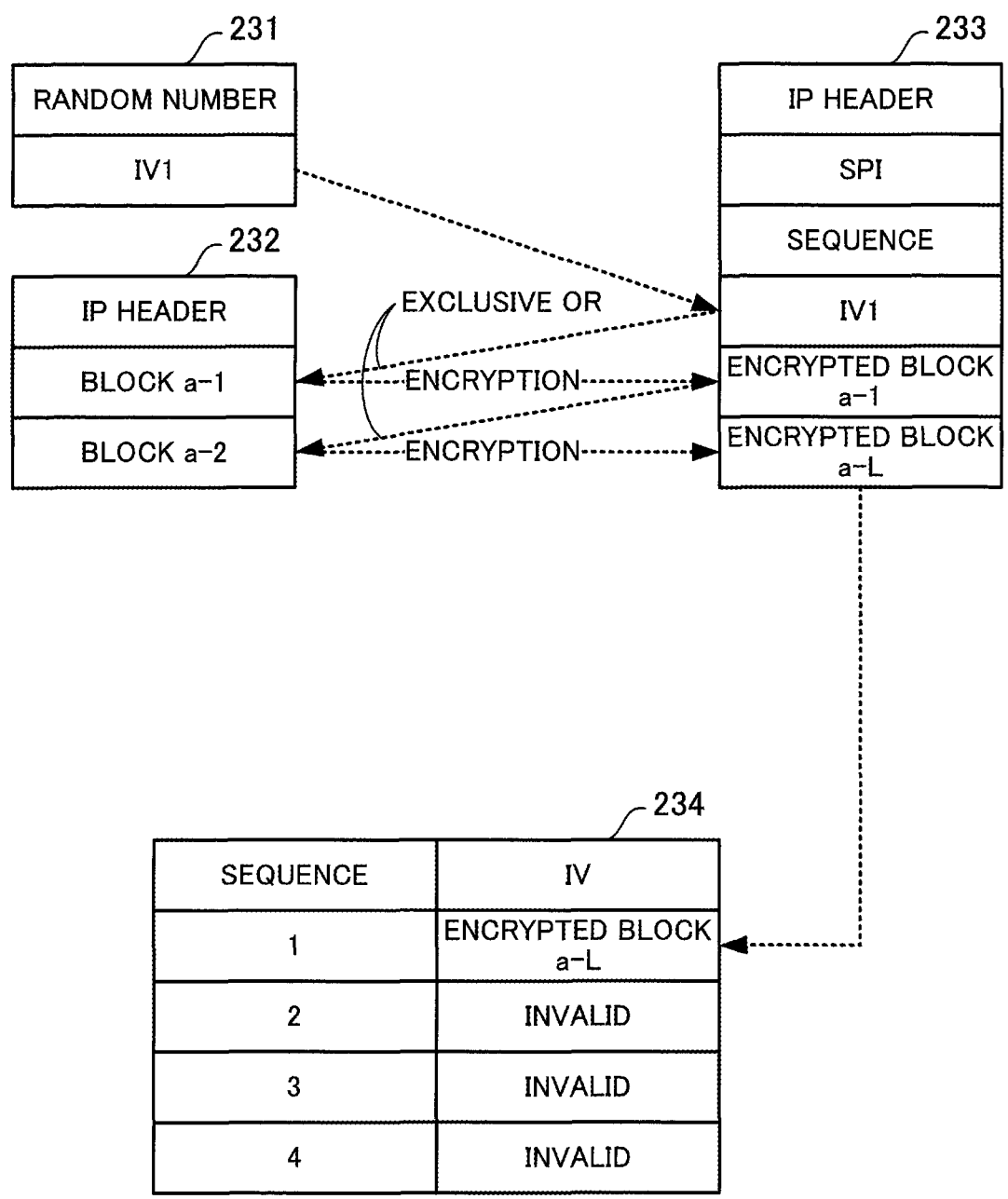
FIG. 10 illustrates an example of user data encryption and SA update in the second embodiment.

Here, there will be explained encryption of the user data a and update of SA by the use of FIG. 10. FIG. 10 illustrates an example of the encryption of the user data and the update of SA in the second embodiment.

Random number 231 is generated by the radio base station apparatus 10 using a predetermined algorithm. IV "IV1" has a value of the random number 231. A packet 232 is a transmission packet received by the radio base station apparatus 10. The packet 232 is an IP packet including the user data a. The packet 232 includes an IP header and a plurality of data blocks. For example, the packet 232 includes a data block "block a-1" and a data block "block a-2". In this case, the data block "block a-1" is a head block located at the head of the plurality of data blocks, and the data block "block a-2" is an end block located at the end of the plurality of blocks.

An IPsec packet 233 is a transmission packet generated by the radio base station apparatus 10. The IPsec packet 233 includes a header and encrypted data. The header includes an IP header and an ESP (Encapsulated Security Payload) header. The ESP header includes SPI, SEQUENCE (sequence number), and IV "IV1". Here, the IPsec packet 233 has a sequence number "1".

The encrypted data is obtained by encrypting plain text data (data block "block a-1", data block "block a-2"). The encrypted data includes a data block "encrypted block a-1" which is obtained by encrypting the data block "block a-1" and a data block "encrypted block a-L" which is obtained by encrypting the data block "block a-2".

The data block "encrypted block a-1" is obtained by encrypting a logical operation result of IV "IV1" and the data block "block a-1" by the use of the key data. While an example of the logical operation is logical sum, the logical operation may be exclusive OR or another kind of operation. The data block "encrypted block a-L" is obtained by encrypting a logic operation result of the data block "encrypted block a-1" and the data block "block a-2" by the use of the key data. Here, when a data block "block a-3" exists subsequent to the data block "block a-2", the radio base station apparatus 10 may encrypt a logical operation result of the data block "encrypted block a-2" and the data block "block a-3".

In this manner, the radio base station apparatus 10 uses IV for encrypting the head block, but, in the encryption of the subsequent blocks, may use an encrypted block which was previously encrypted, instead of IV.

SA 234 is SA managed by the radio base station apparatus 10. SA 234 holds IV for each sequence number. The radio base station apparatus 10 holds the data block "encrypted block a-L" of the end encrypted data as IV of the sequence number "1".

The explanation returns again to explanation using FIG. 9.

(Sequence seq23) The security gateway 30 transmits the IP packet including the user data a obtained by decrypting the encrypted data which has been received from the radio base station apparatus 10, to the core network 40.

(Sequence seq24) The security gateway 30 performs IV delivery confirmation (sequence number "1") to the radio base station apparatus 10. The security gateway 30 may perform the IV delivery confirmation with IKE by setting the message type to be "delivery confirmation".

Thereby, the radio base station apparatus 10 and the security gateway 30 mutually hold the data block "encrypted block a-L" of the end encrypted data as IV of the sequence number "1".

(Sequence seq25) The communication apparatus transmits user data b to the radio base station apparatus 10.

(Sequence seq26) The radio base station apparatus 10 transmits an IPsec packet (sequence number "2") which is obtained by encrypting the user data b, to the security gateway 30.

Figure 11:
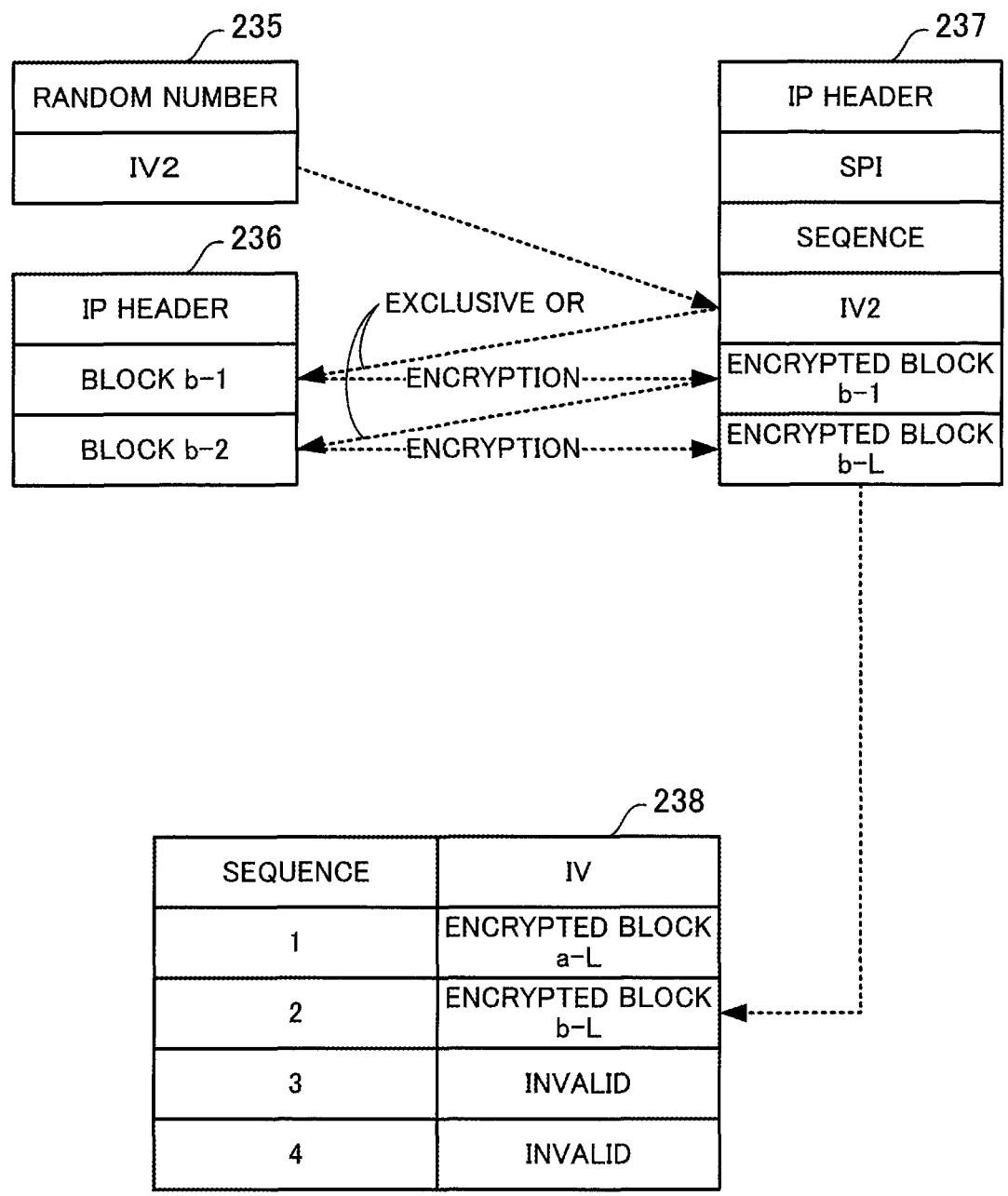
FIG. 11 illustrates an example of user data encryption and SA update in the second embodiment.

Here, there will be explained encryption of the user data b and update of SA, by the use of FIG. 11. FIG. 11 illustrates an example of the encryption of the user data and the update of SA in the second embodiment.

A random number 235 is generated by the radio base station apparatus 10 using the predetermined algorithm. IV "IV2" has a value of the random number 235. A packet 236 is a transmission packet received by the radio base station apparatus 10. The packet 236 includes the user data b, and, for example, includes a data block "block b-1" and a data block "block b-2". In this case, the data block "block b-1" is a head block, and the data block "block b-2" is an end block.

An IPsec packet 237 is a transmission packet generated by the radio base station apparatus 10. The ESP header of the IPsec packet 237 includes IV "IV2". Here, the IPsec packet 237 has a sequence number "2". Encrypted data of the IPsec packet 237 is obtained by encrypting plain text data (data block "block b-1 and data block "block b-2"). The encrypted data includes a data block "encrypted block b-1" obtained by encrypting the data block "block b-1" and a data block "encrypted block b-L" obtained by encrypting the data block "block b-2".

The data block "encrypted block b-1" is obtained by encrypting a logical operation result of IV "IV2" and the data block "block b-1" by the use of the key data. The data block "encrypted block b-L" is obtained by encrypting a logical operation result of the data block "encrypted block b-1" and the data block "block b-2" by the use of the key data.

SA 238 is managed by the radio base station apparatus 10. SA 238 holds IV for each sequence number. The radio base station apparatus 10 holds the data block "encrypted block b-L" of the end encrypted data as IV of the sequence number "2", in addition to the data block "encrypted block a-L" of the end encrypted data as IV of the sequence number "1".

The explanation returns again to explanation using FIG. 9.

(Sequence seq27) The security gateway 30 transmits an IP packet including the user data b which is obtained by decrypting the encrypted data received from the radio base station apparatus 10, to the core network 40.

(Sequence seq28) The security gateway 30 performs the IV delivery confirmation (sequence number "2") to the radio base station apparatus 10.

Thereby, the radio base station apparatus 10 and the security gateway 30 mutually hold the end encrypted data as IV for the sequence number "1" to the sequence number "sequence number difference".

Here, in a communication section between the communication apparatus 41 and the radio base station apparatus 10 and the communication section 43 between the security gateway 30 and the core network 40, data transfer may be performed by the use of GTP-U (GPRS Tunneling Protocol for User Plane), for example. Further, also in the communication section 42 between the radio base station apparatus 10 and the security gateway 30, data transfer may be performed by the use of GTP-U.

Figure 12:
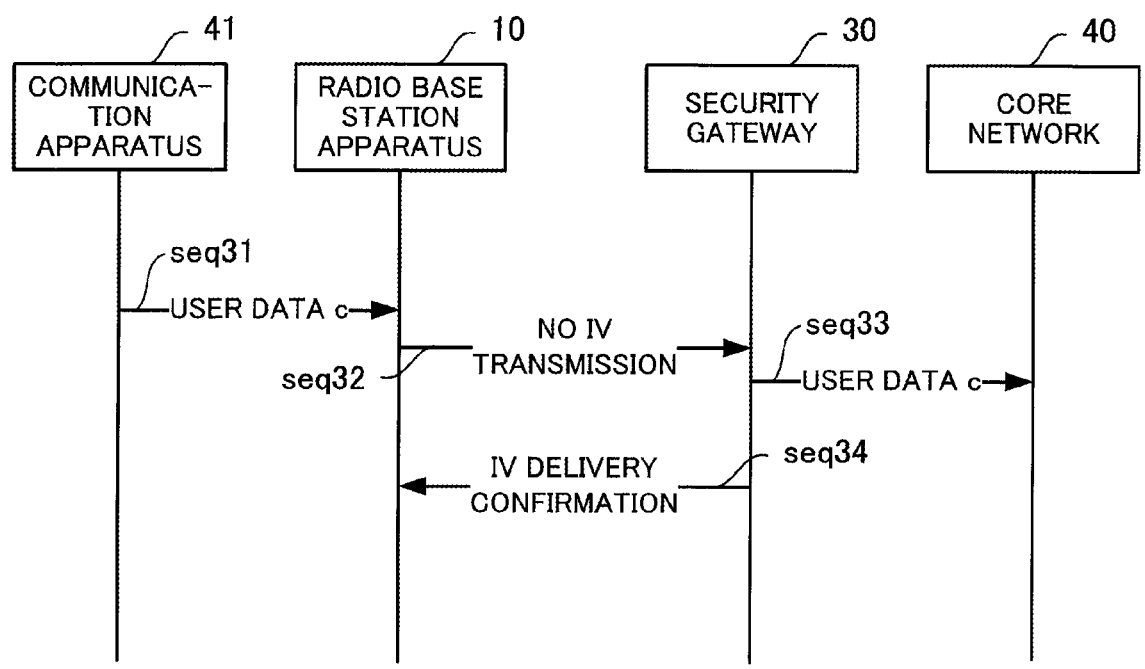
FIG. 12 illustrates an example of a packet transmission sequence without IV attached which is performed by the radio base station apparatus and the security gateway in the second embodiment.

Next, there will be explained packet transmission without IV attached by the use of FIG. 12. FIG. 12 illustrates an example of a packet transmission sequence without IV attached which is performed by the radio base station apparatus and the security gateway in the second embodiment.

The radio base station apparatus 10 and the security gateway 30 perform the encryption communication by IPsec in the packet transmission with IV attached, and, after mutually holding the end encrypted data as IV, perform the packet transmission without IV attached. The radio base station apparatus 10 and the security gateway 30 perform the packet transmission without IV attached after the IPsec packet sequence number exceeds the "sequence number difference". An example illustrated in FIG. 12 will be explained for a sequence number difference of "2".

(Sequence seq31) The communication apparatus 41 transmits user data c to the radio base station apparatus 10.

(Sequence seq32) The radio base station apparatus 10 transmits an IPsec packet (sequence number "3") which is obtained by encrypting the user data c, to the security gateway 30. At this time, the radio base station apparatus 10 does not attach IV to the IPsec packet. Accordingly, the IPsec packet transmitted by the radio base station apparatus 10 has a small overhead applied to the packet transmission.

Figure 13:
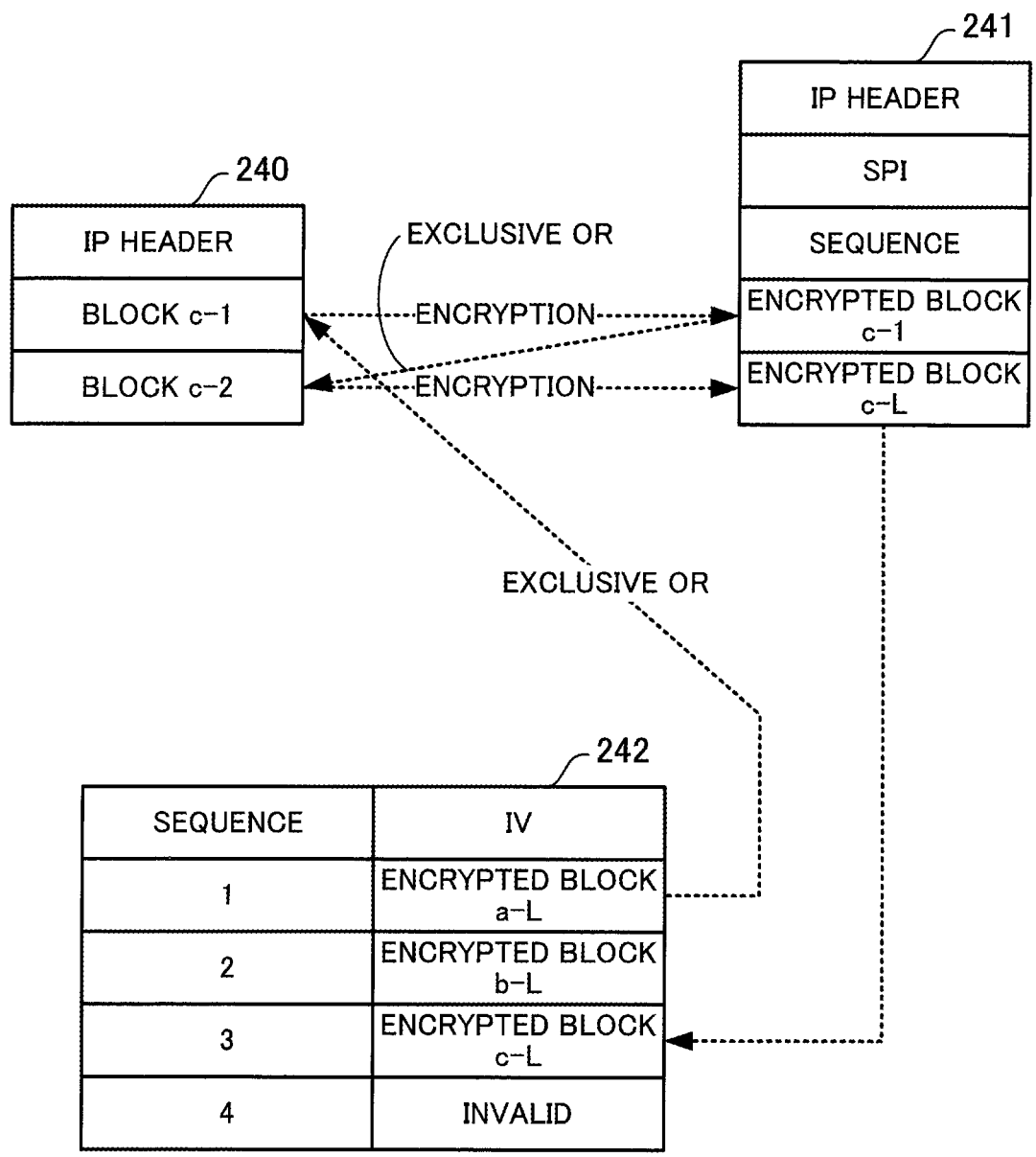
FIG. 13 illustrates an example of user data encryption and SA update in the second embodiment.

Here, there will be explained encryption of the user data c and update of SA, by the use of FIG. 13. FIG. 13 illustrates an example of the encryption of the user data and the update of SA in the second embodiment.

A packet 240 is a transmission packet received by the radio base station apparatus 10. The packet 240 is an IP packet including the user data c. The packet 240 includes an IP header and a plurality of data blocks. For example, the packet 240 includes a data block "block c-1" and a data block "block c-2". In this case, the data block "block c-1" is a head block, and the data block "block c-2" is an end block.

An IPsec packet 241 is a transmission packet generated by the radio base station apparatus 10. The IPsec packet 241 includes a header and encrypted data. The header includes an IP header and an ESP header. The ESP header includes SPI and SEQUENCE, and does not include IV. Here, the IPsec packet 241 has a sequence number "3" which exceeds the sequence number difference "2" and is not an IV attachment target.

The encrypted data is obtained by encrypting plain text data (data block "block c-1" and data block "block c-2"). The encrypted data includes a data block "encrypted block c-1" obtained by encrypting the data block "block c-1" and a data block "encrypted block c-L" obtained by encrypting the data block "block c-2".

The data block "encrypted block c-1" is encrypted by the use of the end encrypted data instead of IV generated from a random number. Since the IPsec packet 241 has the sequence number the encryption is performed by the use of the end encrypted data of a sequence number obtained by subtracting the sequence number difference "2", "1 (=3−2)". The end encrypted data of the sequence number "1" may be obtained with reference to IV held by SA. For example, according to SA 238, the end encrypted data of the sequence number "1" is the data block "encrypted block a-L".

The data block "encrypted block c-1" is obtained by encrypting a logical operation result of the data block "encrypted block a-L" and the data block "block c-1" by the use of the key data. The data block "encrypted block c-L" is obtained by encrypting a logical operation result of the data block "encrypted block c-1" and the data block "block c-2" by the use of the key data.

SA 242 is managed by the radio base station apparatus 10. SA 242 holds IV for each sequence number. The radio base station apparatus 10 holds the data block "encrypted block c-L" of the end encrypted data as IV for the sequence number "3".

The explanation returns again to explanation using FIG. 12.

(Sequence seq33) The security gateway 30 transmits an IP packet including the user data c obtained by decrypting the encrypted data received from the radio base station apparatus 10, to the core network 40.

(Sequence seq34) The security gateway 30 performs the IV delivery confirmation (sequence number "3") to the radio base station apparatus 10.

Thereby, the radio base station apparatus 10 and the security gateway 30 mutually hold the data block "encrypted block c-L" of the end encrypted data as IV for the sequence number "3".

Figure 14:
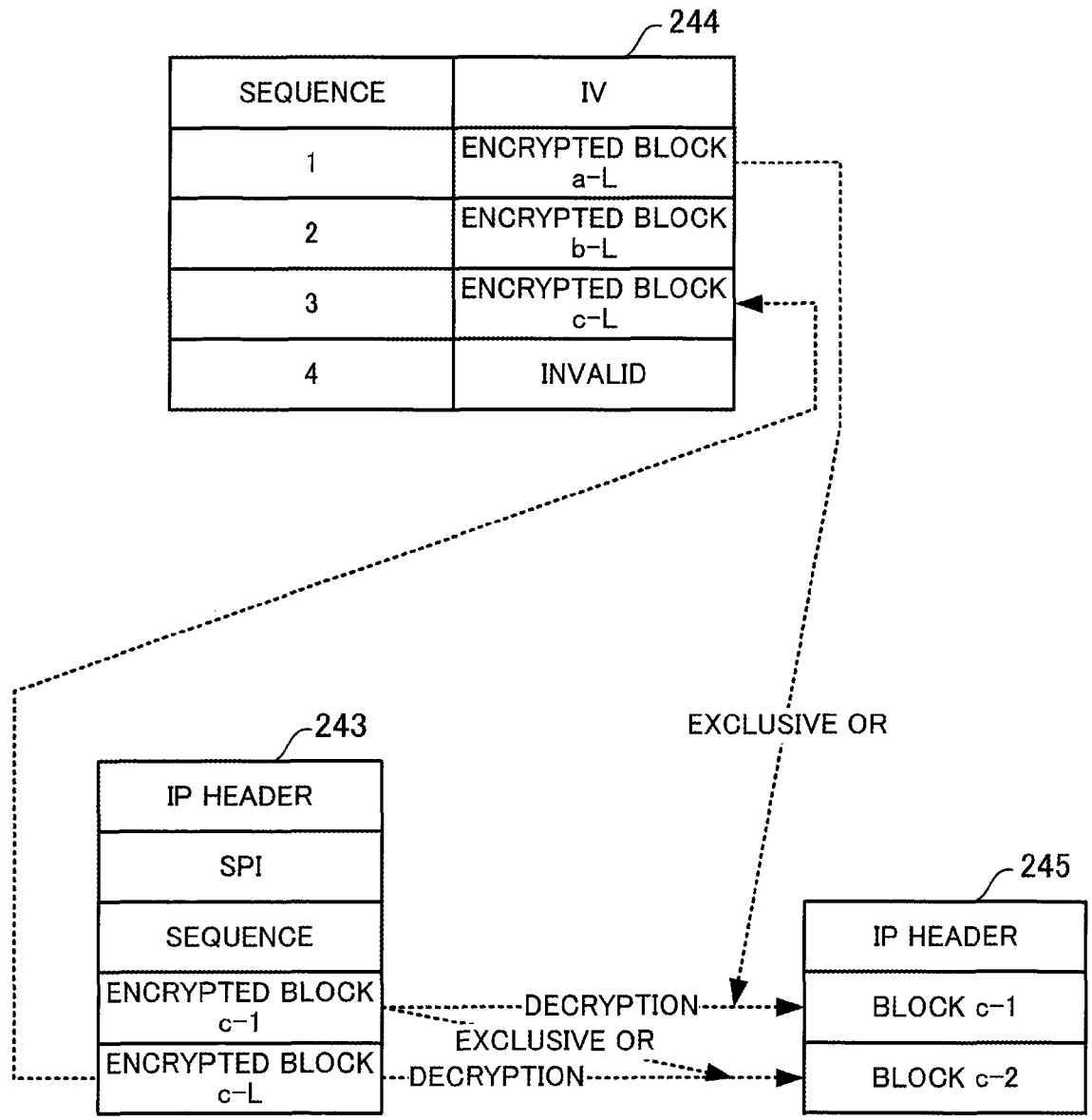
FIG. 14 illustrates an example of user data encryption and SA update in the second embodiment.

Here, there will be explained decryption of the user data c and update of SA by the use of FIG. 14. FIG. 14 illustrates an example of the decryption of the user data and the update of SA in the second embodiment.

An IPsec packet 243 is a transmission packet which has the sequence number "3" and is received by the security gateway 30. The security gateway 30 records the data block "encrypted block c-L" included in the IPsec packet 243 into SA 244 as IV of the sequence number "3".

The security gateway 30 obtains the end encrypted data of the sequence number which is obtained by subtracting the sequence number difference "2" from the sequence number "3" of the IPsec packet 243, from SA 244 as IV to be used for the decryption of the data block "encrypted block c-1".

The data block "block c-1" is a logical operation result of decrypted data of the data block "encrypted block c-1" and the data block "encrypted block a-L" which is the end encrypted data of the sequence number "1". The data block "block c-2" is a logical operation result of decrypted data of the data block "encrypted block c-L" and the data block "encrypted block c-1". In this manner, the security gateway 30 may decrypt the encrypted data into the plain text data.

Further, since sharing the end encrypted data of the IPsec packet having a sequence number previous by the sequence number difference, the radio base station apparatus 10 and the security gateway 30 are capable of decrypting the encrypted data into the plain text data without attaching IV to the IPsec packet. Thereby, the radio access system 9 may reduce the overhead applied to the encrypted data transmission. Accordingly, the radio access system 9 is capable of reducing the network load while improving the security.

Figure 15:
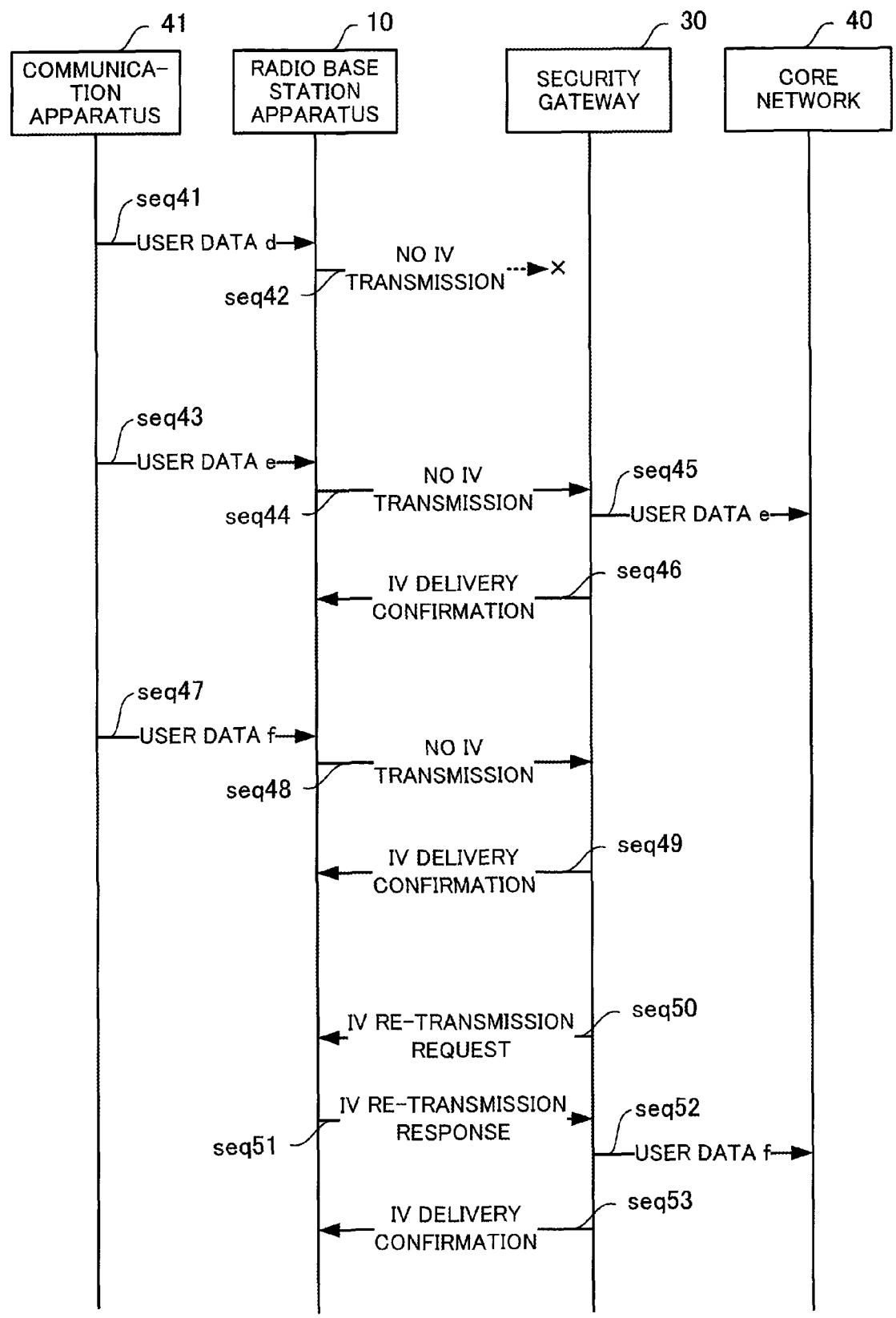
FIG. 15 illustrates an example of a packet re-transmission sequence which is performed in packet transmission by the radio base station and the security gateway in the second embodiment.

Next, there will be explained packet re-transmission in the packet transmission, by the use of FIG. 15. FIG. 15 illustrates an example of a packet re-transmission sequence in the packet transmission which is performed by the radio base station apparatus and the security gateway in the second embodiment.

The radio base station apparatus 10 and the security gateway 30 perform the packet transmission without IV attached, as the IPsec packet sequence number exceeds the sequence number difference.

(Sequence seq41) The communication apparatus transmits user data d to the radio base station apparatus 10.

(Sequence seq42) The radio base station apparatus 10 transmits an IPsec packet (sequence number "4") which is obtained by encrypting the user data d, to the security gateway 30. At this time, the radio base station apparatus 10 does not attach IV to the IPsec packet. The security gateway 30 is unable to receive the IPsec packet normally, because the IPsec packet has been lost during the transmission.

(Sequence seq43) The communication apparatus transmits user data e to the radio base station apparatus 10.

(Sequence seq44) The radio base station apparatus 10 transmits an IPsec packet (sequence number "5") which is obtained by encrypting the user data e, to the security gateway 30. At this time, the radio base station apparatus 10 does not attach IV to the IPsec packet.

(Sequence seq45) The security gateway 30 transmits the IP packet including the user data e obtained by decrypting the encrypted data received from the radio base station apparatus 10, to the core network 40.

(Sequence seq46) The security gateway 30 performs the IV delivery confirmation (sequence number "5") to the radio base station apparatus 10.

(Sequence seq47) The communication apparatus 41 transmits user data f to the radio base station apparatus 10.

(Sequence seq48) The radio base station apparatus 10 transmits an IPsec packet (sequence number "6") obtained by encrypting the user data f to the security gateway 30. At this time, the radio base station apparatus 10 does not attach IV to the IPsec packet.

Here, there will be explained an update state of SA managed by the security gateway 30, by the use of FIG. 16. FIG. 16 illustrates an example of the update state of SA managed by the security gateway in the second embodiment.

SA 250 indicates the update state of SA managed by the security gateway 30 which has received the IPsec packet obtained by encrypting the user data f. "Invalid" of the sequence number "4" indicates that the end encrypted data of the user data d has not been received because the IPsec packet was lost during the transmission. Since the end encrypted data of the user data d is to be used for the decryption of the IPsec packet having the sequence number "6 (=4+2)", the security gateway 30 is not able to perform the decryption into the user data f.

Figure 17:
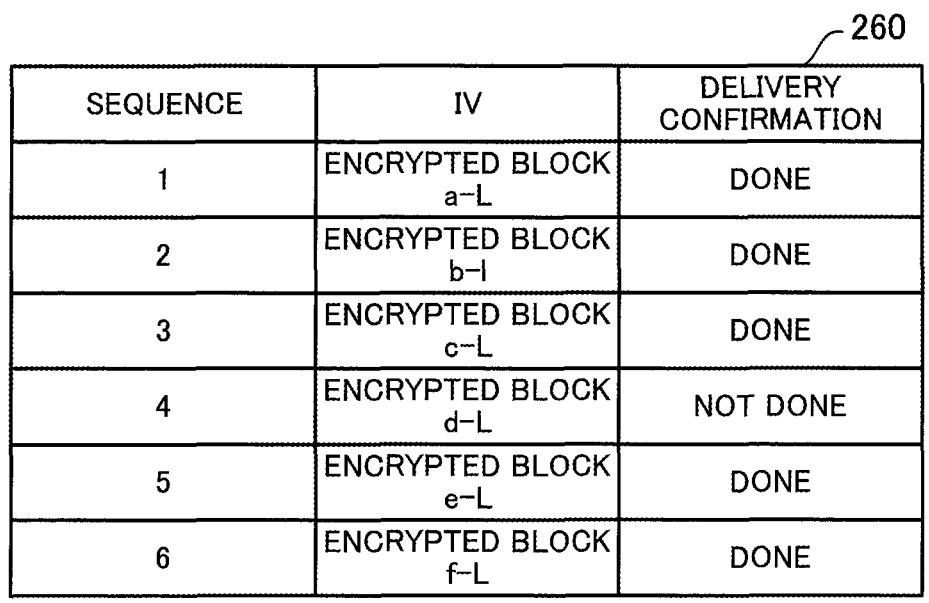
FIG. 17 illustrates an example of an SA update state which is managed by the radio base station apparatus in the second embodiment.

Next, there will be explained an update state of SA managed by the radio base station apparatus 10, by the use of FIG. 17. FIG. 17 illustrates an example of the update state of SA managed by the radio base station apparatus in the second embodiment.

SA 260 indicates the update state of SA managed by the radio base station apparatus 10. SA 260 holds IV for the sequence number "1" to the sequence number "6" which has been transmitted to the security gateway 30, and the delivery confirmations. SA 260 indicates that the delivery confirmation of the sequence "4" has not been received.

The explanation returns again to explanation using FIG. 15.

(Sequence seq49) The security gateway 30 performs the IV delivery confirmation (sequence number "6") to the radio base station apparatus 10.

(Sequence seq50) The security gateway 30 performs an IV re-transmission request of the sequence number "4" to the radio base station apparatus 10 because a predetermined time has elapsed since the reception of the IPsec packet obtained by encrypting the user data f. The security gateway 30 performs the IV re-transmission request with IKE by setting the message type to "re-transmission request".

(Sequence seq51) The radio base station apparatus 10 performs an IV re-transmission response including the end encrypted data of the sequence number "4", upon receiving the IV re-transmission request. The security gateway 30 performs the IV re-transmission response with IKE by setting the message type to "re-transmission response".

(Sequence seq52) The security gateway 30 transmits an IP packet including the user data f obtained by decrypting encrypted data which is received from the radio base station apparatus 10, to the core network 40.

(Sequence seq53) The security gateway 30 performs the IV delivery confirmation of the sequence number "4" to the radio base station apparatus 10.

In this manner, even if the IPsec packet is lost during the transmission, the radio access system 9 may perform the decryption without discarding the subsequent IPsec packets.

Here, since the delivery confirmation for each sequence number is managed in SA, the radio base station apparatus 10 may wait for the transmission of the subsequent IPsec packet when the delivery confirmation is not received. For example, when "valid delivery confirmation" is set, the radio base station apparatus 10 may wait for the transmission of the IPsec packets after the delivery confirmation which has not been received. Even when waiting for the transmission of the IPsec packet, the radio base station apparatus 10 may continue the transmission of the IPsec packet having a different offset of the sequence number difference.

Figure 18:
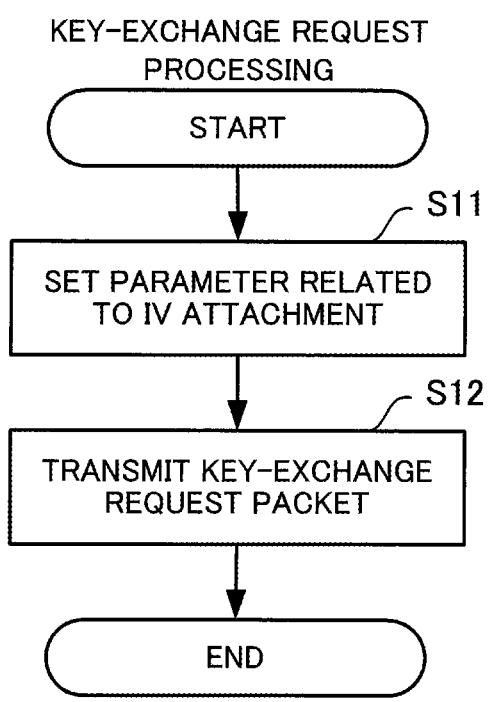
FIG. 18 illustrates a flowchart of key-exchange request processing in the second embodiment.

Next, there will be explained key-exchange request processing carried out by the radio base station apparatus 10 or the security gateway 30, by the use of FIG. 18. FIG. 18 illustrates a flowchart of the key-exchange request processing in the second embodiment.

The key-exchange request processing performs the negotiation for the IPsec communication including the proposal of the IV method and the parameters, with the opposite apparatus. While a case that the radio base station apparatus 10 is a main execution entity will be explained in the following, the explanation is the same as that for a case that the security gateway 30 is the main execution entity. The radio base station apparatus executes the key-exchange request processing before performing the encryption communication by IPsec.

(Step S11) The radio base station apparatus 10 (IV method management unit 16) performs parameter setting related to the IV attachment which is able to be proposed to the opposite apparatus. Further, the radio base station apparatus 10 (key exchange unit 15) sets the encryption algorithm, the key data, and the like to be able to be proposed.

(Step S12) The radio base station apparatus 10 (IKE termination unit 12) transmits a key-exchange request packet (IKE packet) and terminates the key-exchange request processing.

Figure 19:
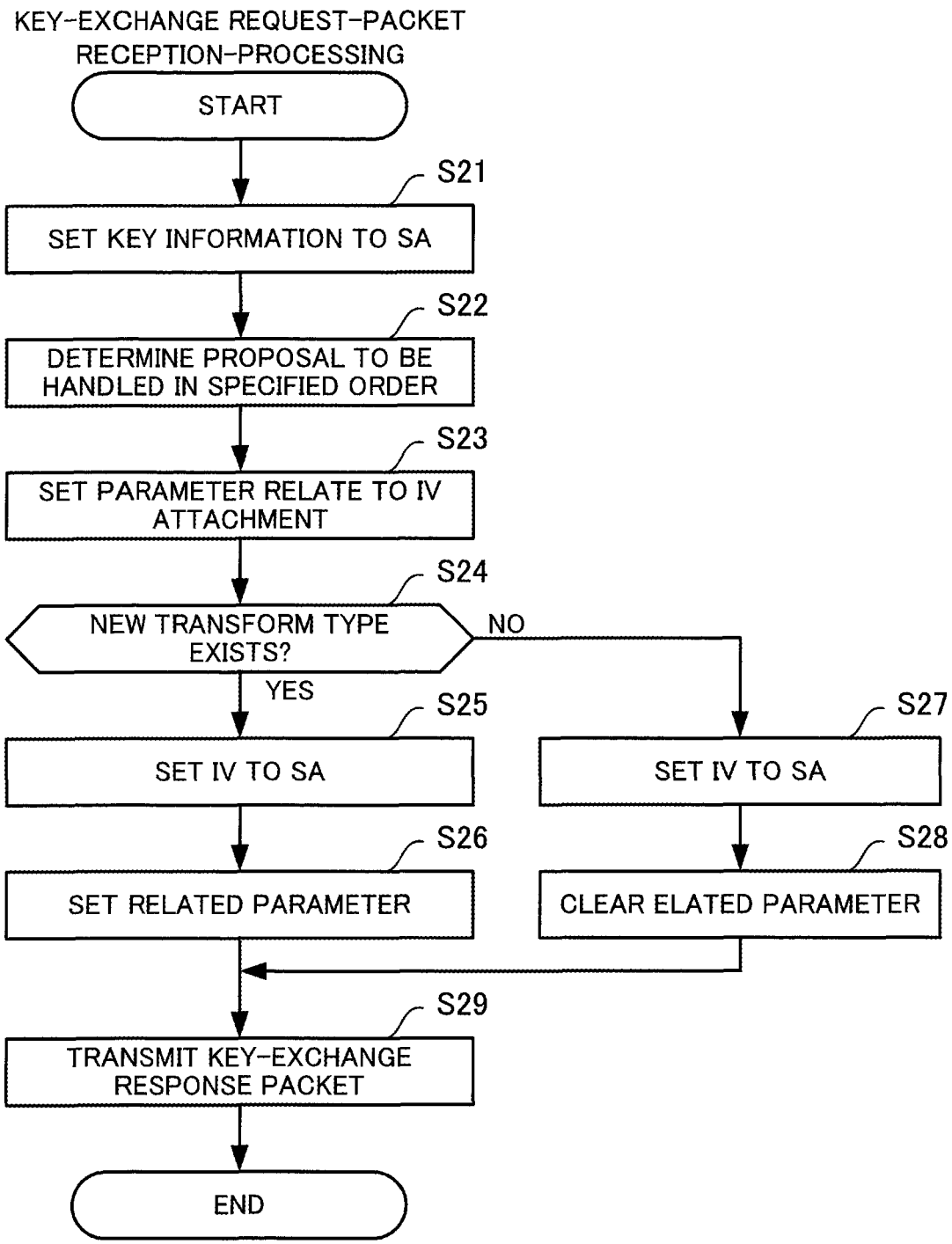
FIG. 19 illustrates a flowchart of key-exchange request packet reception processing in the second embodiment.

Next, there will be explained key-exchange request packet reception processing carried out by the radio base station apparatus 10, by the use of FIG. 19. FIG. 19 illustrates a flowchart of the key-exchange request packet reception processing in the second embodiment.

The key-exchange request packet reception processing performs negotiation for the IPsec communication proposed from the opposite apparatus. The radio base station apparatus 10 executes the key-exchange request packet reception processing triggered by reception of the key-exchange request packet.

(Step S21) The radio base station apparatus 10 (IKE termination unit 12) sets the key information to SA.

(Step S22) The radio base station apparatus 10 (IV method management unit 16) determines whether the proposal may be handled or not in a specified order, and determines an acceptable proposal. For example, the IV method management unit 16 compares the sequence number difference and the size of the replay window. Here, it is one of determination criterions for the proposal to be handled that the sequence number difference exceeds the size of the replay window. The radio access system 9 is capable of reducing influence of a replay attack to defense by causing the sequence number difference to be not smaller than the size of the replay window. The relationship between the sequence number difference and the size of the replay window will be explained below by the use of FIG. 25 and FIG. 26. Further, in the IV method management unit 16, it is one of the determination criterions to be handled whether the re-transmission function exists or not.

(Step S23) The radio base station apparatus 10 (IV method management unit 16) performs the parameter setting related to the IV attachment.

(Step S24) The radio base station apparatus 10 (IV method management unit 16) determines whether a new transform type included in the proposal exists or not. The radio base station apparatus 10 proceeds to step S25 if the new transform type exists, and proceeds to step S27 if the new transform type does not exist.

(Step S25) The radio base station apparatus 10 (IV method management unit 16) sets the IV method based on a selected proposal to SA.

(Step S26) The radio base station apparatus 10 (IV method management unit 16) sets the related parameters to SA from the selected proposal.

(Step S27) The radio base station apparatus 10 (IV method management unit 16) sets the IV method for operating existing processing to SA.

(Step S28) The radio base station apparatus 10 (IV method management unit 16) clears the related parameters from the selected proposal.

(Step S29) The radio base station apparatus 10 (IV method management unit 16) transmits a key-exchange response packet (IKE packet) and terminates the key-exchange request packet reception processing.

Figure 20:
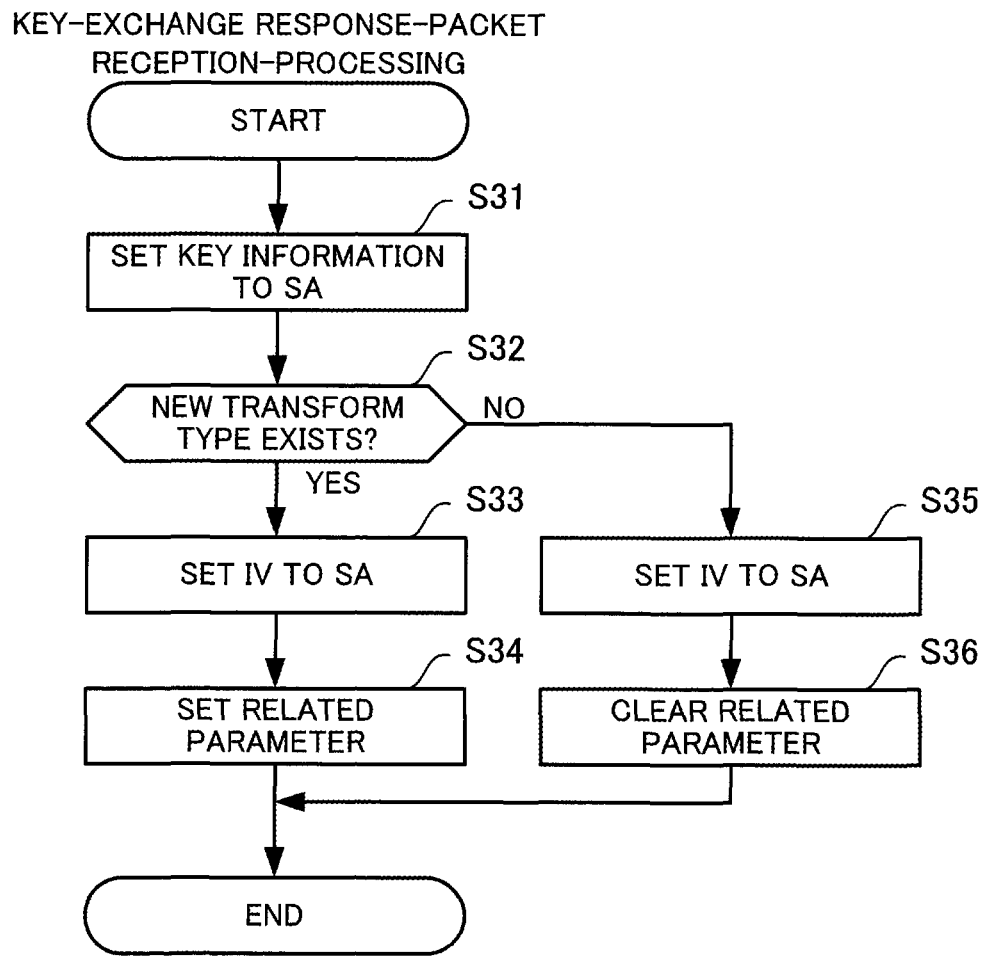
FIG. 20 illustrates a flowchart of key-exchange response packet reception processing in the second embodiment.

Next, there will be explained key-exchange response packet reception processing carried out by the radio base station apparatus 10, by the use of FIG. 20. FIG. 20 illustrates a flowchart of the key-exchange response packet reception processing in the second embodiment.

The key-exchange response packet reception processing sets a communication condition for the IPsec communication according to a response from the opposite apparatus to the proposal. The radio base station apparatus 10 carries out the key-exchange response packet reception processing triggered by the reception of the key exchange response packet.

(Step S31) The radio base station apparatus 10 (IKE termination unit 12) sets the key information to SA.

(Step S32) The radio base station apparatus 10 (IV method management unit 16) determines whether a new transform type included in the response exists or not. The radio base station apparatus 10 proceeds to step S33 if the new transform type exists, and proceeds to step S35 if the new transform type does not exist.

(Step S33) The radio base station apparatus 10 (IV method management unit 16) sets the IV method based on the selected proposal to SA.

(Step S34) The radio base station apparatus 10 (IV method management unit 16) sets the related parameters to SA from the selected proposal, and terminates the key-exchange response packet reception processing.

(Step S35) The radio base station apparatus 10 (IV method management unit 16) sets the IV method for operating the existing processing to SA.

(Step S36) The radio base station apparatus 10 (IV method management unit 16) clears the related parameters from the selected proposal, and terminates the key-exchange response packet reception processing.

Figure 21:
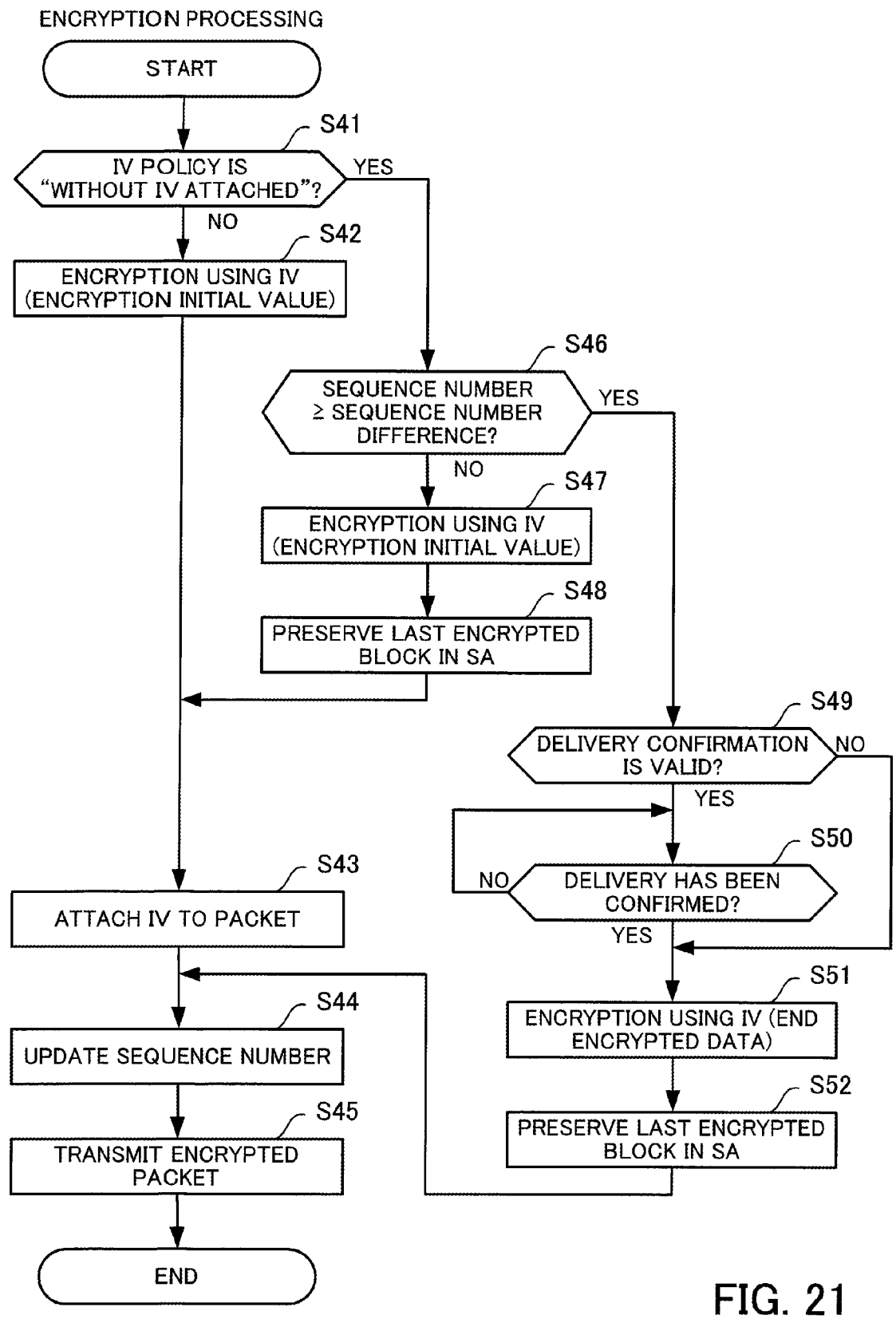
FIG. 21 illustrates a flowchart of encryption processing in the second embodiment.

Next, there will be explained encryption processing carried out by the radio base station apparatus 10, by the use of FIG. 21. FIG. 21 illustrates a flowchart of the encryption processing in the second embodiment.

The encryption processing encrypts the plain text data into the encrypted data and transmits the encrypted packet (IPsec packet).

(Step S41) The radio base station apparatus 10 (SA search unit 18) determines whether the IV attachment policy is "without IV attached" or not. That is, the radio base station apparatus 10 determines "without IV attached" when the IV attachment policy value is "1" or "2" with reference to SA, and determines "with IV attached" when the value is "0". The radio base station apparatus 10 proceeds to step S46 if the IV attachment policy is "without IV attached", and proceeds to step S42 if the IV attachment policy is "with IV attached".

(Step S42) The radio base station apparatus 10 (IV management unit 17) obtains the encryption initial value generated from a random number as IV. The radio base station apparatus 10 (encryption processing unit 19) encrypts the data to be encrypted (plain text data) using the obtained IV.

(Step S43) The radio base station apparatus 10 (encryption processing unit 19) attaches IV used for the encryption to the packet.

(Step S44) The radio base station apparatus 10 (IV management unit 17) updates the sequence number managed in SA.

(Step S45) The radio base station apparatus 10 (encryption processing unit 19) transmits the encrypted packet via the signal interface unit 13, and terminates the encryption processing.

(Step S46) The radio base station apparatus 10 (SA search unit 18) determines whether or not the sequence number of the packet to be transmitted is not smaller than the sequence number difference. The radio base station apparatus 10 proceeds to step S49 if the sequence number is not smaller than the sequence number difference, and proceeds to step S47 if the sequence number is smaller than the sequence number difference.

(Step S47) The radio base station apparatus 10 (IV management unit 17) obtains the encryption initial value generated from a random number as IV. The radio base station apparatus 10 (encryption processing unit 19) encrypts the data to be encrypted (plain text data) using the obtained IV.

(Step S48) The radio base station apparatus 10 (IV management unit 17) preserves the last encrypted block (end encrypted data) in SA as IV, and proceeds to step S43.

(Step S49) The radio base station apparatus 10 (IV management unit 17) determines whether the setting of the delivery confirmation is valid or not. The radio base station apparatus 10 proceeds to step S50 if the setting of the delivery confirmation is valid, and proceeds to step S51 if the setting of the delivery confirmation is invalid.

(Step S50) The radio base station apparatus 10 (IV management unit 17) determines whether or not delivery of the packet of the previous sequence number which has the same offset of the sequence number difference has been confirmed. The radio base station apparatus 10 proceeds to step S51 if the delivery has been confirmed, and waits for the delivery confirmation if the delivery has not been confirmed.

Here, the radio base station apparatus 10 (IV management unit 17) may perform monitoring of delivery confirmation timeout. The radio base station apparatus 10 may proceed to step S47 if the delivery confirmation timeout is detected. Alternatively, the radio base station apparatus 10 may increment the sequence number up to the next delivery-confirmed packet if the delivery confirmation timeout is detected. At this time, by transmitting the packet corresponding to the sequence number until the next delivery-confirmed packet as a dummy packet, the radio base station apparatus 10 enables the delivery confirmation situation to be confirmed and may prevent the security from becoming vulnerable.

(Step S51) The radio base station apparatus 10 (IV management unit 17) obtains the last encrypted block (end encrypted data) of the previous sequence number which has the same offset of the sequence number difference, as IV. The radio base station apparatus 10 (encryption processing unit 19) encrypts the data to be encrypted (plain text data) using the obtained IV.

(Step S52) The radio base station apparatus 10 (IV management unit 17) preserves the last encrypted block (end encrypted data) in SA as IV, and proceeds to step S44.

In this manner, the radio base station apparatus 10 does not attach IV to the packet having the sequence number not smaller than the sequence number difference when the IV attachment policy is "without IV attached".

Figure 22:
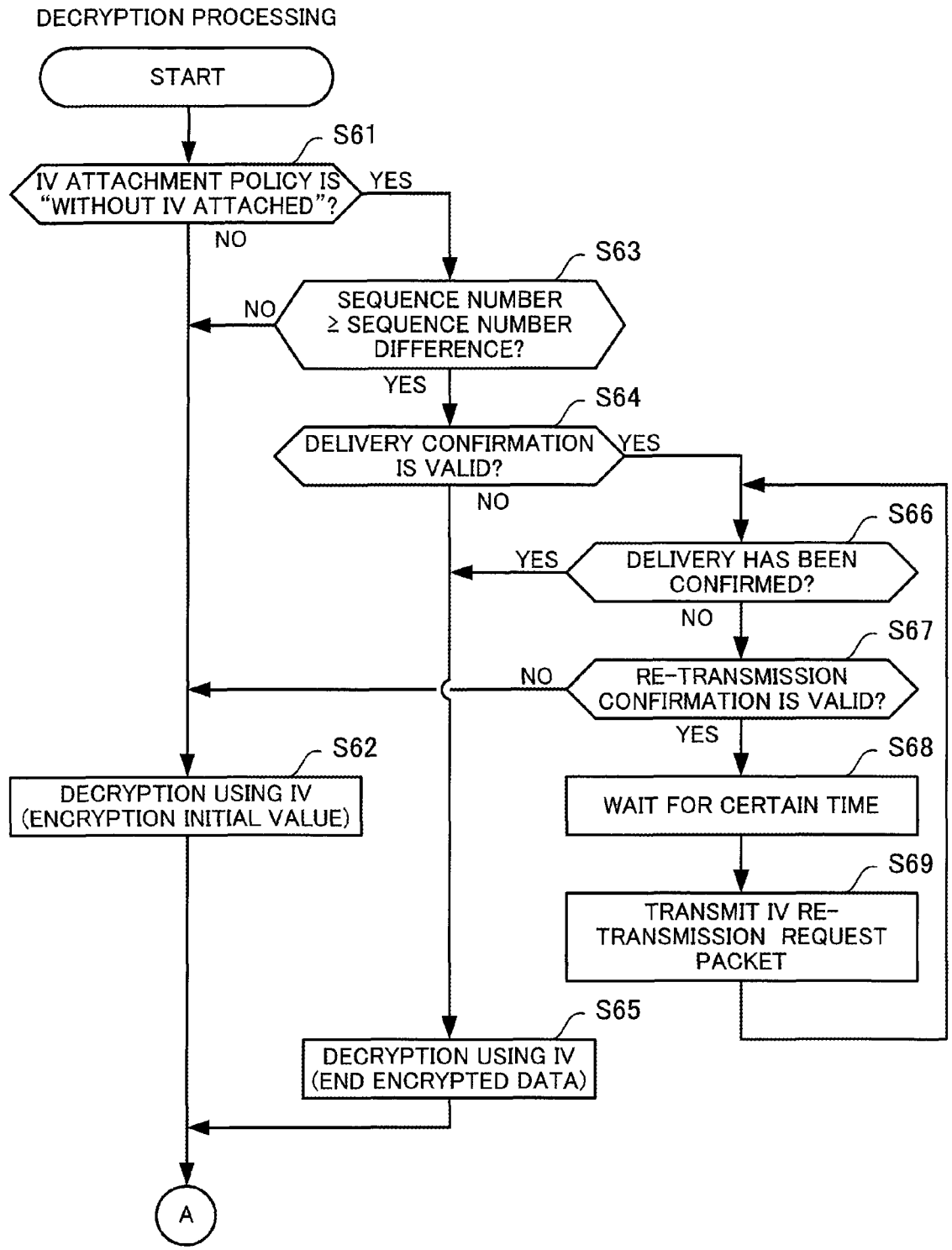
FIG. 22 illustrates a flowchart of decryption processing in a second embodiment.
Figure 23:
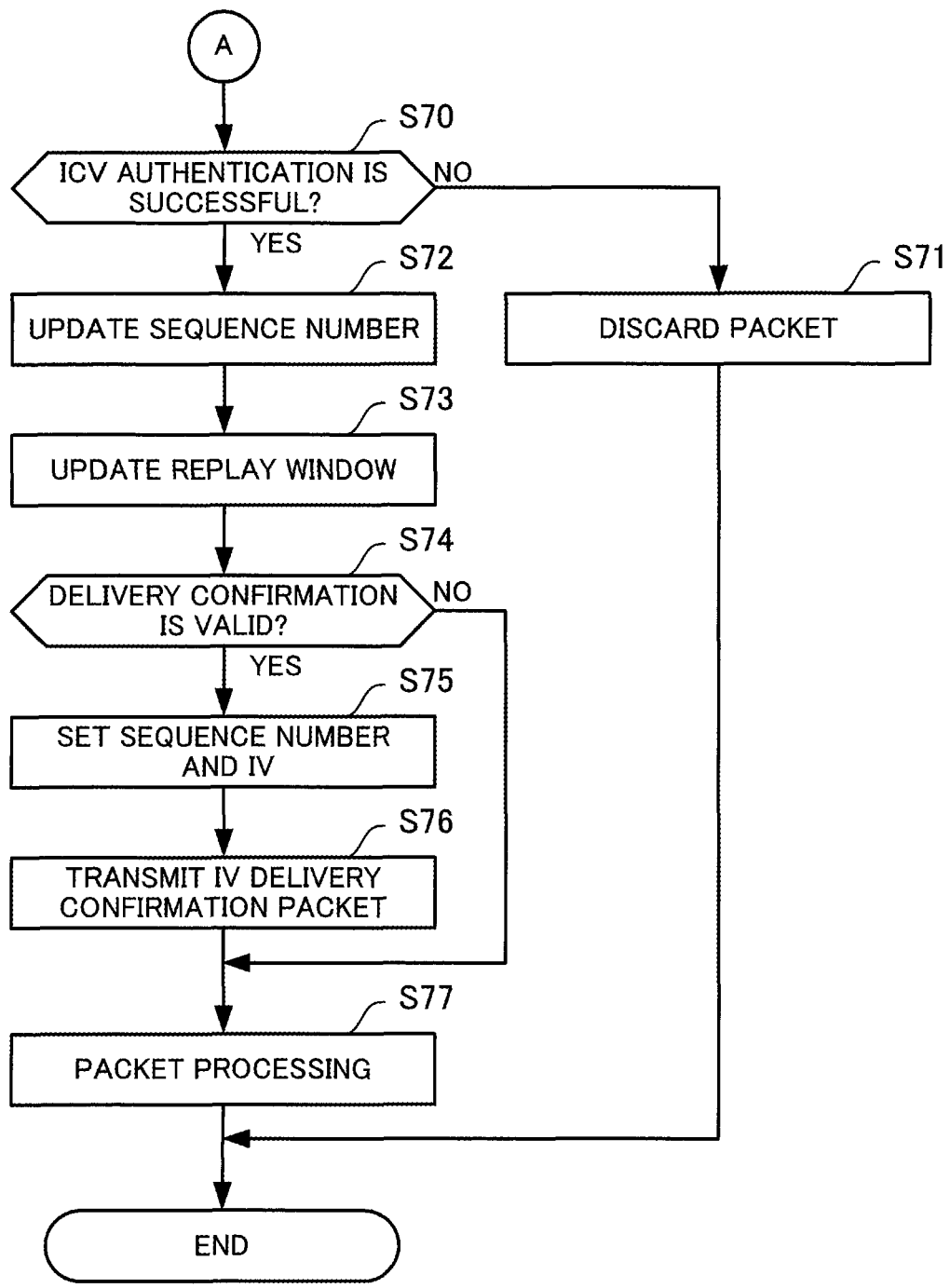
FIG. 23 illustrates a flowchart of decryption processing in the second embodiment.

Next, there will be explained decryption processing carried out by the radio base station apparatus 10, by the use of FIG. 22 and FIG. 23. FIG. 22 and FIG. 23 illustrate a flowchart of the decryption processing in the second embodiment.

The decryption processing decrypts the encrypted packet (IPsec packet) into the plain text data.

(Step S61) The radio base station apparatus 10 (SA search unit 18) determines whether or not the IV attachment policy is "without IV attached". The radio base station apparatus 10 proceeds to step S63 if the IV attachment policy is "without IV attached", and proceeds to step S62 if the IV attachment policy is "with IV attached".

(Step S62) The radio base station apparatus 10 (IV management unit 17) obtains IV attached to the received packet. The radio base station apparatus 10 (decryption processing unit 20) decrypts the encrypted data into the plain text data using the obtained IV.

(Step S63) The radio base station apparatus 10 (SA search unit 18) determines whether or not the sequence number of the received packet is not smaller than the sequence number difference. The radio base station apparatus 10 proceeds to step S64 if the sequence number is not smaller than the sequence number difference, and proceeds to step S62 if the sequence number is smaller than the sequence number difference.

(Step S64) The radio base station apparatus 10 (IV management unit 17) determines whether or not the setting of the delivery confirmation is valid. The radio base station apparatus 10 proceeds to step S66 if the setting of the delivery confirmation is valid, and proceeds to step S65 if the setting of the delivery confirmation is invalid.

(Step S65) The radio base station apparatus 10 (IV management unit 17) obtains IV (end encrypted data) preserved in SA. The radio base station apparatus 10 (decryption processing unit 20) decrypts the encrypted data into the plain text data using the obtained IV.

(Step S66) The radio base station apparatus 10 (IV management unit 17) determines whether or not the delivery of the packet of the previous sequence number which has the same offset of the sequence number difference has been confirmed. The radio base station apparatus 10 proceeds to step S65 if the delivery has been confirmed, and proceeds to steep S67 if the delivery has not been confirmed.

(Step S67) The radio base station apparatus 10 (IV management unit 17) determines whether the setting of the re-transmission confirmation is valid or not. The radio base station apparatus 10 proceeds to step S68 if the setting of the re-transmission confirmation is valid, and proceeds to step S62 if the setting of the re-transmission confirmation is invalid.

(Step S68) The radio base station apparatus 10 (IV management unit 17) waits for a certain time. The certain time may be a preliminarily set time or may be a time which varies depending on an environmental condition of a use band or the like.

(Step S69) The radio base station apparatus 10 (IV management unit 17) transmits the IV re-transmission request packet (IKE packet) to the opposite apparatus, and wait for the IV re-transmission response. That is, the IV management unit 17 functions as a re-transmission request unit.

(Step S70) The radio base station apparatus 10 (decryption processing unit 20) performs authentication of the received packet by ICV (Integrity Check Value). The radio base station apparatus 10 proceeds to step S72 if the authentication is successful, and proceeds to step S71 if the authentication is not successful.

(Step S71) The radio base station apparatus 10 (decryption processing unit 20) discards the received packet, and terminates the decryption processing.

(Step S72) The radio base station apparatus 10 (IV management unit 17) updates the sequence number managed in SA.

(Step S73) The radio base station apparatus 10 (IV management unit 17) updates the replay window.

(Step S74) The radio base station apparatus 10 (IV management unit 17) determines whether the setting of the delivery confirmation is valid or not. The radio base station apparatus 10 proceeds to step S75 if the setting of the delivery confirmation is valid, and proceeds to step S77 if the setting of the delivery confirmation is invalid.

(Step S75) The radio base station apparatus 10 (IV management unit 17) sets the sequence number and IV for which the delivery has been confirmed, in an IV delivery confirmation packet.

(Step S76) The radio base station apparatus 10 (IV management unit 17) transmits the IV delivery confirmation packet (IKE packet) to the opposite apparatus. That is, the IV management unit 17 functions as a delivery response unit returning the delivery confirmation to the opposite apparatus.

Here, the IV delivery confirmation packet may be collectively transmitted in a range of the replay window size (e.g., ½ or ¼). Further, The radio base station apparatus 10 (IV management unit 17) may replace padding data of an ESP packet and may transmit the sequence number and IV for which the delivery has been confirmed.

(Step S77) The radio base station apparatus 10 (decryption processing unit 20) performs packet processing corresponding to the decrypted data, and terminates the decryption processing.

Figure 24:
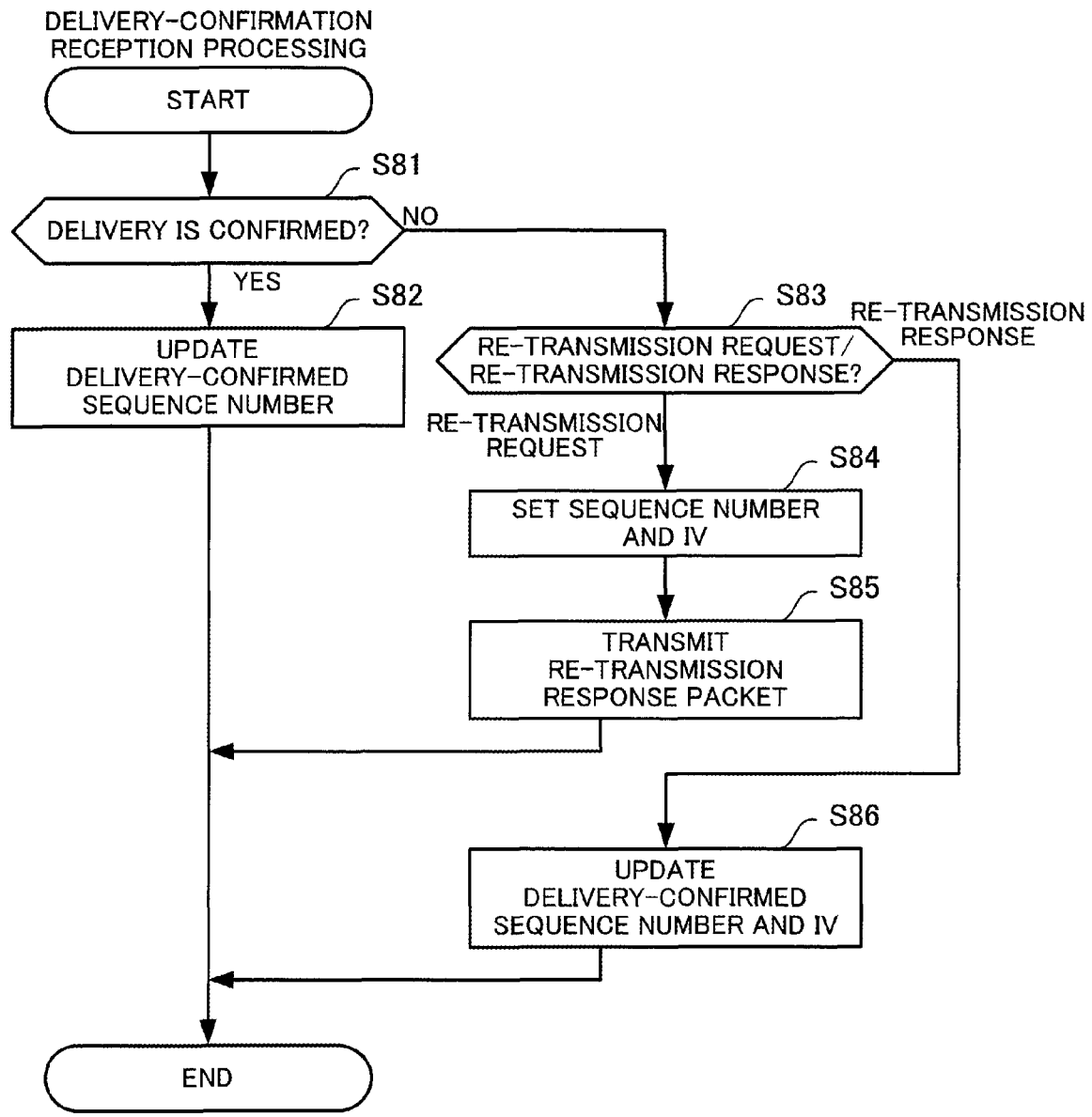
FIG. 24 illustrates a flowchart of delivery confirmation reception processing in the second embodiment.

Next, there will be explained delivery confirmation reception processing carried out by the radio base station apparatus 10, by the use of FIG. 24. FIG. 24 illustrates a flowchart of the delivery confirmation reception processing in the second embodiment.

The delivery confirmation reception processing handles a predetermined message received from the opposite apparatus. The radio base station apparatus 10 carries out the delivery confirmation reception processing when having received the predetermined message from the opposite apparatus.

(Step S81) The radio base station apparatus 10 (IV management unit 17) determines whether or not the message received from the opposite apparatus is the delivery confirmation. The radio base station apparatus 10 proceeds to step S82 if the message received from the opposite apparatus is the delivery confirmation, and proceeds to step S83 if the message is not the delivery confirmation.

(Step S82) The radio base station apparatus 10 (IV management unit 17) updates the sequence number which is recorded in SA and for which the delivery has been confirmed, and terminates the delivery confirmation reception processing.

(Step S83) The radio base station apparatus 10 (IV management unit 17) determines whether the message received from the opposite apparatus is the re-transmission request or the re-transmission response. The radio base station apparatus 10 proceeds to step S84 if the message received from the opposite apparatus is the re-transmission request, and proceeds to step S86 if the message is the re-transmission response.

(Step S84) The radio base station apparatus 10 (IV management unit 17) sets the sequence number and IV which have been transmitted, in a re-transmission response packet.

(Step S85) The radio base station apparatus 10 (IV management unit 17) transmits the re-transmission response packet (IKE packet) to the opposite apparatus, and terminates the delivery confirmation reception processing. That is, the IV management unit 17 functions as a re-transmission response unit.

(Step S86) The radio base station apparatus 10 (IV management unit 17) updates the sequence number and IV which are recorded in SA and for which the delivery has been confirmed, and terminates the delivery confirmation reception processing.

Figure 25:
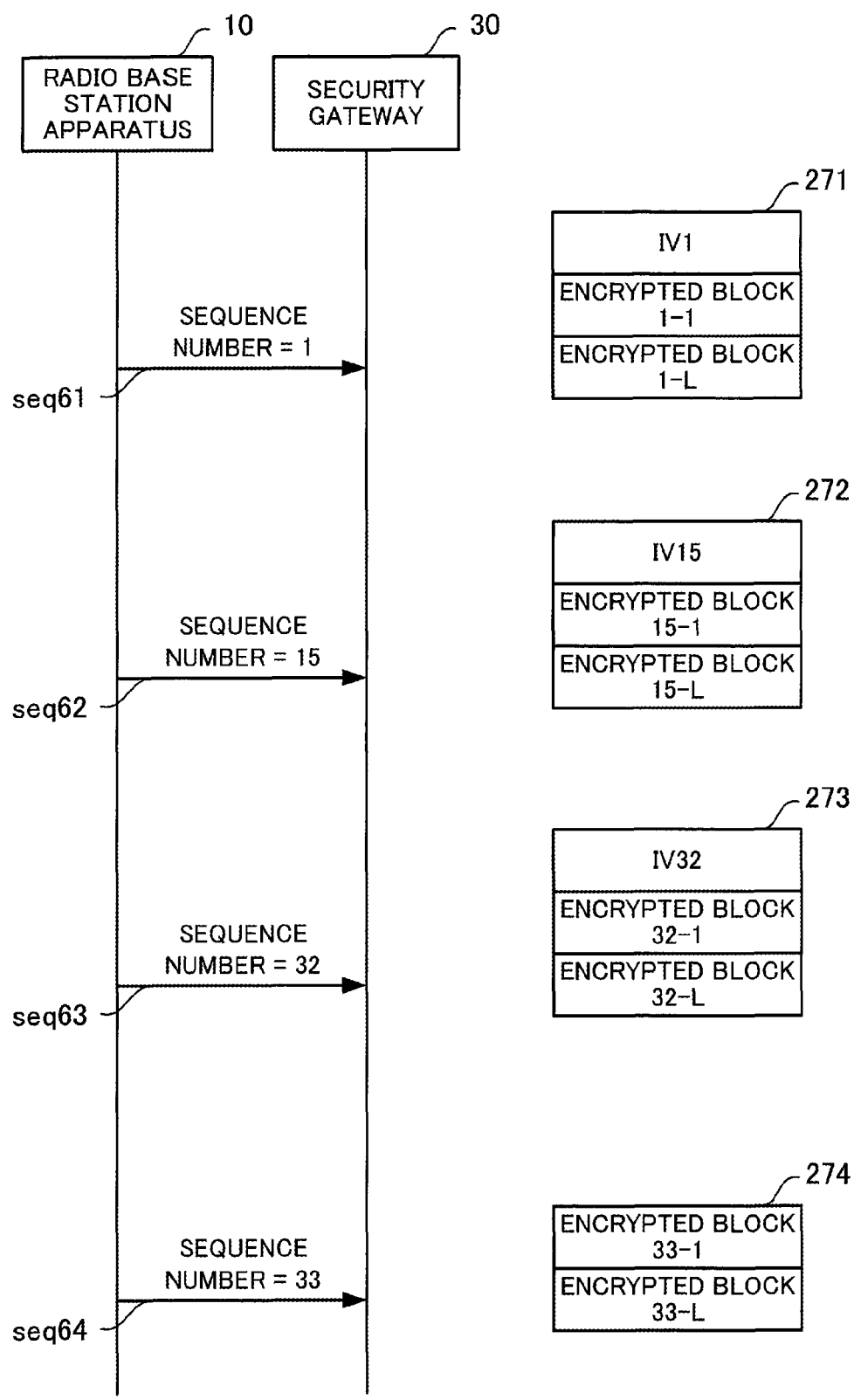
FIG. 25 illustrates an example of SA update in the packet transmission sequence of the second embodiment.
Figure 26:
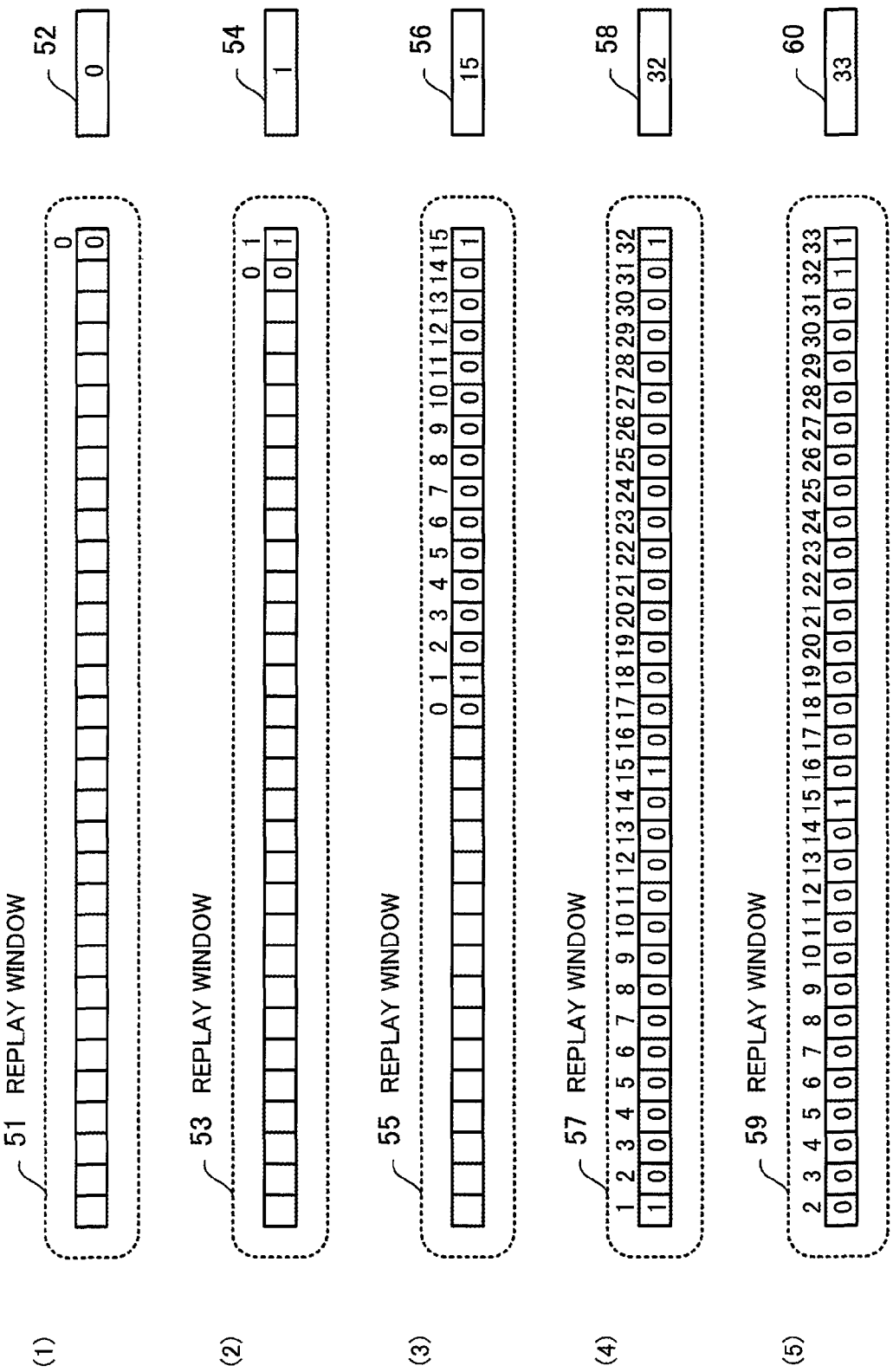
FIG. 26 illustrates an example of a replay window and sequence number update in a packet transmission sequence of the second embodiment.

Next, there will be explained a relationship between the sequence number difference and the size of the replay window, by the use of FIG. 25 and FIG. 26. FIG. 25 illustrates an example of SA update in the packet transmission sequence of the second embodiment. FIG. 26 illustrates an example of update of the replay window and the sequence number in the packet transmission sequence of the second embodiment.

The radio base station apparatus 10 and the security gateway 30 are assumed to set the sequence number difference to "32", and to prepare the replay window having a size of "32". Before the transmission of the first IPsec packet, a replay window 51 managed by the security gateway 30 indicates the state of not yet receiving the packet and indicates that the latest sequence number 52 is "0" (FIG. 26(1)).

(Sequence seq61) The radio base station apparatus 10 transmits an IPsec packet 271 having a sequence number "1" to the security gateway 30. At this time, the IPsec packet 271 includes IV "IV1", a data block "encrypted block 1-1", and a data block "encrypted block 1-L".

The security gateway 30 receives the IPsec packet 271 and performs replay window check. In the replay window check, the security gateway 30 performs decryption using IV, when the sequence number of the received IPsec packet 271 is larger than the latest sequence number or in the range of the replay window. The security gateway 30 performs update of the replay window and update of the latest sequence number, when a decryption result is normal.

Accordingly, since the sequence number "1" is larger than the latest sequence number 52 "0", the IPsec packet 271 becomes a decryption target. When the IPsec packet 271 is decrypted normally, the replay window 51 and the latest sequence number 52 are updated into a replay window 53 and the latest sequence number 54 (FIG. 26(2)). The replay window 53 indicates that the packet having the sequence number "1" has been received, and the latest sequence number 54 is "1". The data block "encrypted block 1-1" and the data block "encrypted block 1-L" are decrypted by the use of "IV1" which is an encryption initial value.

(Sequence seq62) The radio base station apparatus 10 transmits an IPsec packet 272 having a sequence number "15" to the security gateway 30. At this time, the IPsec packet 272 includes IV "IV15", a data block "encrypted block 15-1", and a data block "encrypted block 15-L".

Since the sequence number "15" is larger than the latest sequence number 54 "1", the IPsec packet 272 becomes a decryption target. When the IPsec packet 272 is decrypted normally, the relay window 53 and the latest sequence number 54 are updated into a replay window 55 and the latest sequence number 56 (FIG. 26(3)). The replay window 55 indicates that the packets having the sequence numbers "1" and "15" have been received, and the latest sequence number 56 is "15". The data block "encrypted block 15-1" and the data block "encrypted block 15-L" are decrypted by the use of "IV15" which is an encryption initial value.

(Sequence seq63) The radio base station apparatus 10 transmits an IPsec packet 273 having a sequence number "32" to the security gateway 30. At this time, the IPsec packet 273 includes IV "IV32", a data block "encrypted block 32-1" and a data block "encrypted block 32-L".

Since the sequence number "32" is larger than the latest sequence number 56 "15", the IPsec packet 273 becomes a decryption target. When the IPsec packet 273 is decrypted normally, the relay window 55 and the latest sequence number 56 are updated into a replay window 57 and the latest sequence number 58 (FIG. 26(4)). The replay window 57 indicates that the packets having the sequence numbers "1", "15", and "32" have been received, and the latest sequence number 58 is "32". The data block "encrypted block 32-1" and the data block "encrypted block 32-L" are decrypted by the use of "IV32" which is an encryption initial value.

(Sequence seq64) The radio base station apparatus 10 transmits an IPsec packet 274 having a sequence number "33" to the security gateway 30. At this time, the IPsec packet 274 includes a data block "encrypted block 33-1" and a data block "encrypted block 33-L"

Since the sequence number "33" is larger than the latest sequence number 58 "32", the IPsec packet 274 becomes a decryption target. When the IPsec packet 274 is decrypted normally, the replay window 57 and the latest sequence number 58 are updated into a replay window 59 and the latest sequence number 60 (FIG. 26(5)). The replay window 59 indicates that the packets having the sequence numbers "15", "32", and "33" have been received, and the latest sequence number 60 is "33".

At this time, the security gateway 30 decrypts the data block "encrypted block 1-L" which is the end encrypted data, as IV. In this manner, the radio access system 9 sets the sequence number difference "32" which is not smaller than the replay window size "32", and thereby is able to alleviate the problem of delay in the replay window update and the problem of delay in the latest sequence number update which are caused by waiting for IV.

Here, the radio access system 9 supposes states before and after the arrival of the IPsec packet having the replay window size, and thereby avoids waiting for IV within the replay window by setting the sequence number difference to be not smaller than the replay window size.

Further, the radio access system 9 may prepare a margin for handling the states before and after the arrival of the IPsec packet, and thereby may avoid waiting for IV within the replay window. At this time, the sequence number difference may be set to be not smaller than the sum of the replay window size and the margin. In other words, a subtraction value of the margin from the sequence number difference may be not smaller than the replay window size.

Thereby, the radio access system 9 prevents that a trouble in replay attack check causes vulnerability, by improving independence of the IV waiting and the replay window update.

Figure 27:
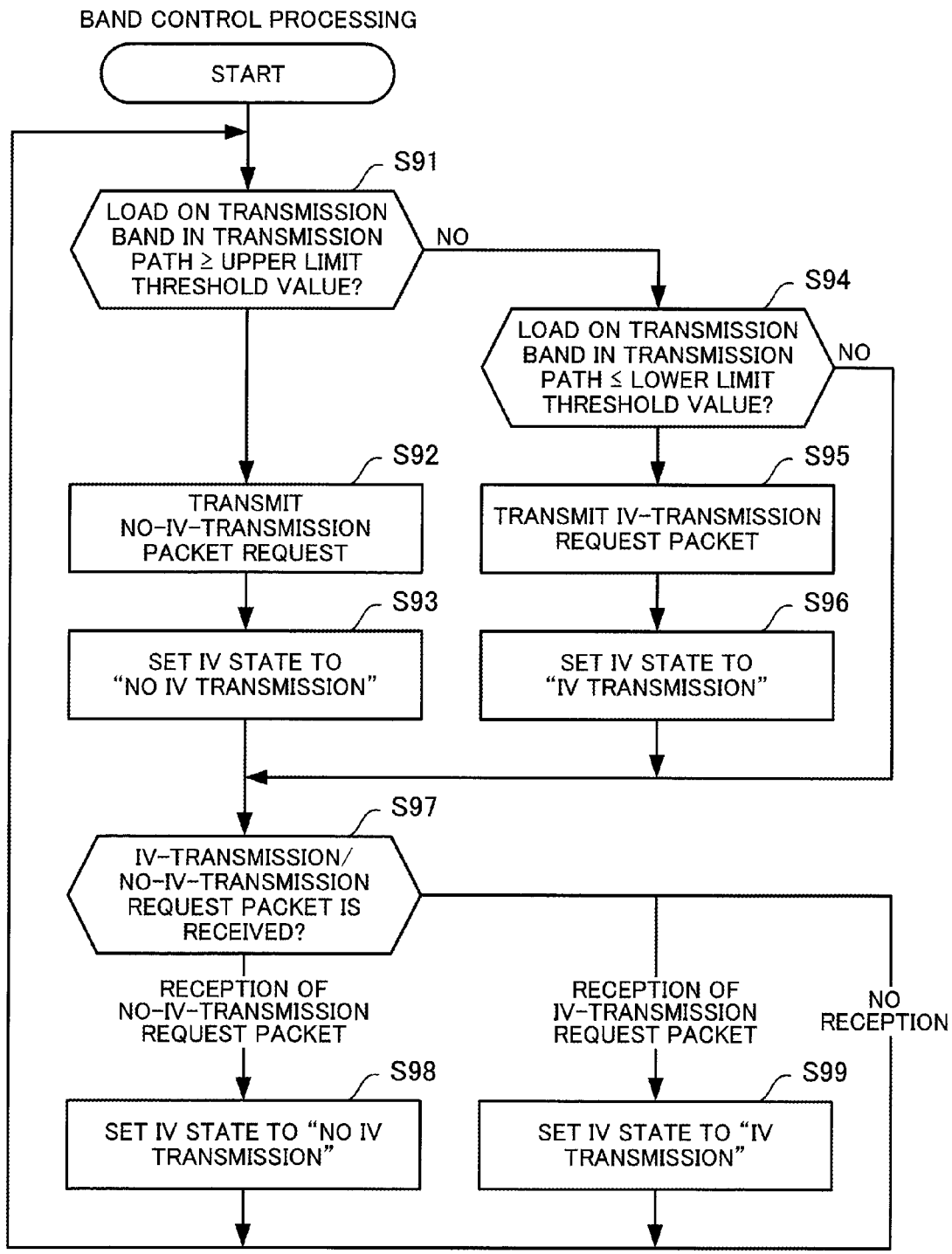
FIG. 27 illustrates a flowchart of band control processing in the second embodiment.

Next, there will be explained band control processing carried out by the radio base station apparatus 10, by the use of FIG. 27. FIG. 27 illustrates a flowchart of the band control processing in the second embodiment.

The band control processing switches the IV state according to a load on a transmission band in a transmission path.

(Step S91) The radio base station apparatus 10 (IV management unit 17) detects the load on the transmission band in the transmission path, and determines whether or not the load is not smaller than a preliminarily set upper limit threshold value. The radio base station apparatus 10 proceeds to step S92 if the load on the transmission band in the transmission path is not smaller than the upper limit threshold value, and proceeds to step S94 if the load on the transmission band in the transmission path is smaller than the upper limit threshold value. In this case, the radio base station apparatus 10 includes a detector detecting the load on the transmission band in the transmission path.

(Step S92) The radio base station apparatus 10 (IV management unit 17) transmits a no-IV-transmission request packet (IKE packet) to the opposite apparatus. The radio base station apparatus 10 performs the no-IV-transmission request in IKE by setting the transmission message type to "no-IV-transmission request".

(Step S93) The radio base station apparatus 10 (IV management unit 17) sets the IV state of SA to "no IV transmission".

(Step S94) The radio base station apparatus 10 (IV management unit 17) detects the load on the transmission band in the transmission path, and determines whether or not the load is not larger than a preliminarily set lower limit threshold value. The radio base station apparatus 10 proceeds to step S95 if the load on the transmission band in the transmission path is not larger than the lower limit threshold value, and proceeds to step S97 if the load on the transmission band in the transmission path is larger than the lower limit threshold value.

(Step S95) The radio base station apparatus 10 (IV management unit 17) transmits an IV-transmission request packet (IKE packet) to the opposite apparatus. The radio base station apparatus 10 performs the IV-transmission request in IKE by setting the transmission message type to "IV-transmission request".

(Step S96) The radio base station apparatus 10 (IV management unit 17) sets the IV state of SA to "IV transmission".

(Step S97) The radio base station apparatus 10 (IV management unit 17) determines whether or not the no-IV-transmission request packet, or the IV-transmission request packet has been received. The radio base station apparatus 10 proceeds to step S98 if the no-IV-transmission request packet has been received, and proceeds to step S99 if the IV-transmission request packet has been received. The radio base station apparatus 10 proceeds to step S91 if both of the no-IV-transmission request packet and the IV-transmission request packet have not been received. In this case, the opposite apparatus includes a detector detecting the load on the transmission band in the transmission path.

(Step S98) The radio base station apparatus 10 (IV management unit 17) sets the IV state of SA to "no IV transmission".

(Step S99) The radio base station apparatus 10 (IV management unit 17) sets the IV state of SA to "IV transmission".

Thereby, the radio base station apparatus 10 may switch the IV state into "no IV transmission" or "IV transmission" according to the load on the transmission band in the transmission path detected by the radio base station apparatus 10. Further, the radio base station apparatus 10 may switch the IV state into "no IV transmission or "IV transmission" according to the load on the transmission band in the transmission path detected by the opposite apparatus.

In this manner, since the radio access system 9 switches the IV state into "no IV transmission" or "IV transmission" according to the load on the transmission band in the transmission path, it is possible to achieve reduction in the processing amount when the transmission band in the transmission path has a margin. Thereby, the radio access system 9 is able to suppress the delay caused by the waiting or the re-transmission.

Meanwhile, in a strained state of the transmission band in the transmission path, the radio access system 9 may realize load reduction of the transmission band in the transmission path by reducing the overhead applied to the transmission.

Here, the above processing function may be realized by a computer. In this case, a program is provided describing the processing contents of the function which is to be owned by each of the first transmission apparatus 2, the second transmission apparatus 3, the radio base station apparatus 10, and the security gateway 30. Execution of the program by the computer realizes the above processing function on the computer. The program describing the processing contents may be recorded in a computer-readable recording medium. The computer-readable recording medium includes a magnetic storage apparatus, an optical disk, a magneto-optical recording medium, a semiconductor memory, and the like. The magnetic storage apparatus includes a hard disk apparatus (HDD), a flexible disk (FD), a magnetic tape, and the like. The optical disk includes DVD, DVD-RAM, CD-ROM/RW, and the like. The magneto-optical recording medium includes MO (Magneto-Optical Disk) and the like.

When the program is distributed, for example, a portable recording medium is sold such as DVD and CD-ROM in which the program has been recorded. Further, the program may be stored in a storage apparatus of a server computer, and the program may be transferred from the sever computer to another computer via a network.

The computer to execute the program stores the program recorded in the portable recording medium or the program transferred from the server computer, for example, into an own storage apparatus. Then, the computer reads the program from the own storage apparatus, and executes processing according to the program. Here, the computer also may read the program directly from the portable recording medium, and may execute the processing according to the program. Further, every time the program is transferred from the server computer connected via the network, the computer also may execute the processing sequentially according to the received program.

Further, at least a part of the above processing function may be realized by an electronic circuit such as DSP, ASIC, and PLD.

According to one aspect, it is possible to reduce the network load while realizing the security improvement in the transmission system and the transmission method.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A transmission system comprising a first apparatus to encrypt data, and a second apparatus to receive encrypted data from the first apparatus and decrypt the encrypted data, the first apparatus having a first processor and a first memory, wherein the first processor is configured to
encrypt a head block among a plurality of blocks obtained by dividing data to be encrypted, using an encryption initial value, and using an encrypted block among the plurality of blocks, encrypt a block next to the encrypted block,
transmit first encrypted data originated from the plurality of blocks and the encryption initial value to the second apparatus, the first encrypted data including encrypted data generated by using the head block and the encryption initial value,
store end encrypted data obtained by encrypting an end block among the plurality of blocks in the first memory,
encrypt a head block among a plurality of blocks obtained by dividing data to be encrypted, using the end encrypted data stored in the first memory, and
transmit second encrypted data originated from the plurality of blocks to the second apparatus, the second encrypted data including encrypted data generated by using the head block and the end encrypted data, and the second apparatus having a second processor and a second memory, wherein the second processor is configured to
perform decryption on the first encrypted data using the encryption initial value, the first encrypted data and the encryption initial value being received from the first apparatus;
store the end encrypted data included in the first encrypted data in the second memory; and
decrypt the second encrypted data received from the first transmission apparatus, using the end encrypted data stored in the second memory.

2. The transmission system according to claim 1, wherein the second processor stores the end encrypted data included in the second encrypted data in the second memory, and decrypts encrypted data received next to the second encrypted data from the first apparatus, using the end encrypted data that is included in the second encrypted data and stored in the second memory.

3. The transmission system according to claim 1, wherein when the end encrypted data to be used for decryption are not stored in the second memory, the second processor performs decryption after storing the end encrypted data to be used for decryption in the second memory.

4. The transmission system according to claim 3, wherein the second processor is further configured to, when the end encrypted data to be used for decryption are not stored in the second memory, request the first apparatus to re-transmit the end encrypted data to be used for the decryption, and the first processor is further configured to re-transmit the end encrypted data to be used for the decryption to the second apparatus, upon receiving the re-transmission request.

5. The transmission system according to claim 1, wherein the first processor transmits a predetermined number of packets for transmitting the first encrypted data, using successive sequence numbers, and transmits excess packets for transmitting the second encrypted data, over the predetermined number of packets.

6. The transmission system according to claim 5, wherein the predetermined number is set to be equal to or larger than a size of a replay window which detects duplication of a sequence number.

7. The transmission system according to claim 1, wherein one of the first apparatus and the second apparatus includes a detector configured to detect a load on a transmission path between the first apparatus and the second apparatus, and the first apparatus includes a switcher configured to switch from a state of not performing transmission of the second encrypted data to a state of performing the transmission of the second encrypted data, according to the detected load by the detector.

8. The transmission system according to claim 1, wherein the second processor returns delivery confirmation of the first encrypted data or the second encrypted data to the first apparatus, and the first processor performs encryption using the end encrypted data of the first encrypted data for which the delivery has been confirmed, or the end encrypted data of the second encrypted data for which the delivery has been confirmed.

9. A transmission method performed by first and second apparatuses, the first apparatus having a first memory and a first processor which encrypts data and transmits the encrypted data to the second apparatus, the second apparatus having a second memory and a second processor which receives the encrypted data from the first apparatus and decrypts the encrypted data, the method comprising:

transmitting, by the first processor, first encrypted data including encrypted data obtained by encrypting a head block among a plurality of blocks obtained by dividing data to be encrypted, using an encryption initial value, and encrypted data obtained by encrypting, using an encrypted block among the plurality of blocks, a block next to the encrypted block, and the encryption initial value to the second apparatus, and storing end encrypted data obtained by encrypting an end block among the plurality of blocks in the first memory;

transmitting, by the first processor, second encrypted data including encrypted data obtained by encrypting a head block among a plurality of blocks obtained by dividing data to be encrypted, using the end encrypted data stored in the first memory, and encrypted data obtained by encrypting, using an encrypted block among the plurality of blocks, a block next to the encrypted block, to the second apparatus;

performing, by the second processor, decryption on the first encrypted data using the encryption initial value, the first encrypted data and the encryption initial value being received from the first apparatus;

storing, by the second processor, the end encrypted data included in the first encrypted data in the second memory; and decrypting, by the second processor, the second encrypted data received from the first apparatus, using the end encrypted data stored in the second memory.

10. An encrypting apparatus which encrypts data transmitted to a decrypting apparatus, the encrypting apparatus comprising:

a processor and a memory storing an encryption initial value, wherein the processor performs a procedure including generating first encrypted data including encrypted data obtained by encrypting a head block among a plurality of blocks obtained by dividing data to be encrypted, using the encryption initial value, and encrypted data obtained by encrypting, using an encrypted block among the plurality of blocks, a block next to the encrypted block, wherein the first encrypted data and the encryption initial value are transmitted to the decrypting apparatus;

storing end encrypted data obtained by encrypting an end block among the plurality of blocks in the memory; and generating second encrypted data including encrypted data obtained by encrypting a head block among a plurality of blocks obtained by dividing data to be encrypted, using the end encrypted data stored in the memory, and encrypted data obtained by encrypting, using an encrypted block among the plurality of blocks, a block next to the encrypted block, wherein the second encrypted data are transmitted to the decrypting apparatus.

* * * * *